(12) United States Patent
Ståhl

(10) Patent No.: US 11,863,663 B2
(45) Date of Patent: Jan. 2, 2024

(54) INITIAL NETWORK AUTHORIZATION FOR A COMMUNICATIONS DEVICE

(71) Applicant: Telefonaktiebolaget LM Ericsson (publ), Stockholm (SE)

(72) Inventor: Per Ståhl, Klagshamn (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 176 days.

(21) Appl. No.: 16/982,140

(22) PCT Filed: Mar. 20, 2018

(86) PCT No.: PCT/EP2018/057047
§ 371 (c)(1),
(2) Date: Sep. 18, 2020

(87) PCT Pub. No.: WO2019/179608
PCT Pub. Date: Sep. 26, 2019

(65) Prior Publication Data
US 2021/0203488 A1    Jul. 1, 2021

(51) Int. Cl.
*H04L 9/08* (2006.01)
*H04L 9/32* (2006.01)
*H04L 67/306* (2022.01)

(52) U.S. Cl.
CPC ............ *H04L 9/0825* (2013.01); *H04L 9/088* (2013.01); *H04L 9/0838* (2013.01);
(Continued)

(58) Field of Classification Search
CPC ..... H04L 9/0825; H04L 9/0838; H04L 9/088; H04L 9/3247; H04L 9/3271; H04L 67/306
(Continued)

(56) References Cited

U.S. PATENT DOCUMENTS

2007/0204330 A1* 8/2007 Townsley ............ H04L 9/3271
726/4
2015/0200774 A1* 7/2015 Le Saint .................. H04L 9/14
713/171
(Continued)

FOREIGN PATENT DOCUMENTS

EP    2461613 A1    6/2012
EP    3 151 593 A1    4/2017
(Continued)

OTHER PUBLICATIONS

International Search Report and Written Opinion issued in International Application No. PCT/EP2018/057047 dated Oct. 24, 2018 (13 pages).
(Continued)

*Primary Examiner* — Moeen Khan
(74) *Attorney, Agent, or Firm* — Rothwell, Figg, Ernst & Manbeck, P.C.

(57) ABSTRACT

There is provided mechanisms for initial network authentication between a communications device and a network. A method is performed by the communications device. The communications device comprises an identity module supporting remote subscription profile download. The identity module comprises credentials for remote subscription profile download. The method comprises performing a first message exchange with an authentication server. The first message exchange comprises an identity module challenge obtained from the identity module being transmitted to the authentication server from the communications device. The method comprises receiving a second message from the authentication server. The second message comprises an ephemeral public key of the authentication server, an authentication server challenge and an authentication server signature. The authentication server signature is based on the
(Continued)

ephemeral public key of the authentication server, the authentication server challenge, and the identity module challenge and follows a format used for handling remote subscription profile download to the identity module. The method comprises transmitting a third message towards the authentication server. The third message comprises an ephemeral public key of the communications device and an identity module signature. The identity module signature is based on the identity module credentials used for remote subscription profile download and is based on the ephemeral public key of the communications device and the authentication server challenge and follows the format used for remote subscription profile download to the identity module. The method comprises generating a master session key (MSK) from a shared secret established using the ephemeral public key of the authentication server and a private key corresponding to the ephemeral public key of the communications device. The MSK is for use when establishing secure communication between the communications device and the network.

16 Claims, 8 Drawing Sheets

(52) U.S. Cl.
CPC .......... *H04L 9/3247* (2013.01); *H04L 9/3271* (2013.01); *H04L 67/306* (2013.01)

(58) Field of Classification Search
USPC .......................................................... 713/171
See application file for complete search history.

(56) References Cited

U.S. PATENT DOCUMENTS

| 2016/0301529 | A1* | 10/2016 | Park ...................... H04L 63/126 |
| 2016/0302061 | A1 | 10/2016 | Park et al. |
| 2020/0015069 | A1* | 1/2020 | Anslot ................ H04L 63/0853 |

FOREIGN PATENT DOCUMENTS

| WO | WO 2016/178548 | * | 11/2016 |
| WO | 2017/004466 A1 | | 1/2017 |
| WO | 2018206097 | | 11/2018 |
| WO | 2019137630 | | 7/2019 |
| WO | 2019179608 | | 9/2019 |

OTHER PUBLICATIONS

J. Arko et al., "Improved Extensible Authentication Protocol Method for 3rd Generation Authentication and Key Agreement (EAP-AKA')," Network Working Group, Request for Comment (RFC) 5448, May 2009 (29 pages).
B. Aboba et al., "Extensible Authentication Protocol (EAP)," Network Working Group, Request for Comments (RFC) 3748, Jun. 2004 (67 pages).
3GPP TR 33.899 V1 .3.0 (Aug. 2017), 3rd Generation Partnership Project; Technical Specification Group Services and System Aspects; Study on the security aspects of the next generation system (Release 14), Aug. 2017 (605 pages).
GSMA, eSIM, "The SIM for the next Generation of Connected Consumer Devices," 2020 (3 pages).
GSMA, Internet of Things, Remote SIM Provisioning for Machine to Machine, "What is the GSMA Embedded SIM Specification," 2020 (3 pages).
GSMA, "Remote Provisioning Architecture for Embedded UICC", Technical Specification, Version 4.2, Jul. 7, 2020, GSM Association Non-confidential Official Document SGP.02—Remote Provisioning Architecture for Embedded UICC Technical Specification (452 pages).
3GPP TS 33.501 V17.3.0 (Sep. 2021) Technical Specification 3rd Generation Partnership Project: Technical Specification Group Services and System Aspects; Security architecture and procedures for 5G system (Release 17) (258 pages).
3GPP TSG SA WG3 (Security) Meeting #84, "Secure Mechanism to Achieve Remote Credential Provisioning for IoT devices", S3-161000, Jul. 25-29, 2016, Chennai, India (4 pages).
Samsung, "Support for Provisioning Profile for credential provisioning," 3GPP Document No. S3-170798, 3GPP TSG SA WG3 (Security) Meeting #86Bis Mar. 31, 2017, Busan, Korea (4 pages).
Nokia, "Network access for remote provisioning of a UE—security considerations", 3GPP TSG SA WG3 (Security) Meeting SA3-NextGen, S3-161353; Sep. 27-29, 2016, San Diego, USA (3 pages).
Bruni, Alessandro et al: "Formal Verification of Ephemeral Diffie-Hellman over COSE (EDHOC)". IT University of Copenhagen, Copenhagen, Denmark, 2018 (16 pages).
GSMA, "RSP Technical Specification, Version 2.2", Official Document GSP .22—RSP Technical Specification, Sep. 1, 2017 (264 pages).
GSMA RSP Technical Specification Version 2.2.1 Dec. 18, 2018 (250 pages).
GSMA, The SIM for the next Generation of Connected Consumer Devices, web page located at https://web.archive.org/web/20180626185307/https://www.gsma.com/esim/, Jun. 2018 (3 pages).
GSMA: SGP.22—SGP.22 RSP Technical Specification, Version 2.2.2 Jun. 5, 2020 (268 pages).
OMASpecWorks, "Lightweight Machine to Machine Technical Specification: Core, Approved Version 1.1, OMA-TS-LightweightM2M_Core-V1_1-20180710-A", Jul. 10, 2018, URL: http://openmobilealliance.org/release/LightweightM2M/V1_1-20180710-A/ (142 pages).
OMASpecworks, "Lightweight Machine to Machine Technical Specification: Transport Bindings, Approved Version 1.1, OMA-TS-LightweightM2M_Transport-V1_1-20180710-A", Jul. 10, 2018, URL: http://openmobilealliance.org/release/LightweightM2M/V1_1-20180710-A/ (67 pages).
Rescorla, E., "The Transport Layer Security (TLS) Protocol Version 1.3", RFC 8446, DOI 10.17487/RFC8446, Aug. 2018 (160 pages).
Rescorla, E. et al—"The Datagram Transport Layer Security (DTLS) Protocol Version 1.3 draft-ietf-tls-dtls13-30". Nov. 5, 2018 (58 pages).
Schaad, J.—"CBOR Object Signing and Encryption (COSE)". Jul. 2017. RFC: 8152 ISSN: 2070-1721, (121 pages).
Selander, G. et al—"Ephemeral Diffie-Hellman Over COSE (EDHOC) draft-selander-ace-cose-ecdhe-11", IETF Internet-Draft, 2019, Work in Progress (46 pages).
Selander, G. et al—"Object Security for Constrained RESTful Environments (OSCORE) draft-ietf-core-object-security-15", IETF Internet-Draft, 2018, Work In Progress, (96 pages).
Shelby, E. et al., "The Constrained Application Protocol (CoAP)", IEFT Request for Comments (RFC) 7252, Jun. 2014, (112 pages).
GSMA,"eSIM Whitepaper, The what and how of Remote SIM Provisioning" Mar. 2018 (21 pages).

\* cited by examiner

INITIAL NETWORK AUTHORIZATION FOR A COMMUNICATIONS DEVICE

CROSS REFERENCE TO RELATED APPLICATION(S)

This application is a 35 U.S.C. § 371 National Stage of International Patent Application No. PCT/EP2018/057047, filed Mar. 3, 2018, designating the United States.

TECHNICAL FIELD

Embodiments presented herein relate to a method, a communications device, an authentication server, a computer program, and a computer program product for initial network authentication between the communications device and a network.

BACKGROUND

In communications networks, there may be a challenge to obtain good performance and capacity for a given communications protocol, its parameters and the physical environment in which the communications network is deployed.

For example, one parameter in providing good performance and capacity for a given communications protocol in a communications network is security. In general terms, proper security mechanisms are needed to prevent misuse of connected devices. As a non-limiting illustrative example, distributed denial of service (DDoS) attacks against popular websites might utilize poorly protected connected devices, such as cameras running the Internet Protocol (IP), routers, digital video recorders running the Internet Protocol, and so on.

Connected devices may also be entrusted with valuable, sensitive, or private data that needs to be protected from unauthorized access. Identity management is a central part of security and device life-cycle management. A connected device generally needs an identity to be able to identify and authenticate itself to its counterparts in the network in order to establish secure communication to other connected devices or services. This is needed at the connectivity layer when connecting to a network and at the application layer when connecting to a service of the network. Secure communication protects sensor data, or control data for actuators, but is also needed for provisioning of identities to the connected device and for secure configuration of the connected device, including secure firmware update.

Identities are also the base for an access control mechanism controlling who can access resources of a connected device, including who can provision additional identities to the connected device.

A simplified block diagram of a communications network 100 is illustrated in FIG. 1. A connected communications device 200 is provided network access by a network node 110, such as a network gateway (GW), an access point (AP), or a radio base station (RBS) of a connectivity provider network 120. For example, the connectivity provider network may offer network access using WiFi, or cellular telecommunications systems such as fourth generation wireless system supporting the Long Term Evolution (LTE) standard and/or a fifth generation wireless system. The connectivity provider network 120 further comprises an authentication server 300I, 300E, which could be an authentication, authorization, and accounting (AAA) server, an Authentication Server Function (AUSF) server, or a Mobility Management Entity (MME). Subscriber information for connectivity may be stored in the authentication server 300I, 300E or may be stored in a separate network entity, which could be a home subscriber server (HSS) 140, a Unified Data Management (UDM) server, and/or an Authentication credential Repository and Processing Function (ARPF) server, and which separate network entity also provides authentication material for use by the authentication server 300I, 300E. For network access authentication, the connectivity provider may use an authentication service provided by another vendor. Hence, additionally or alternatively, the authentication server (such as authentication server 300E) may be located outside of the connectivity provider network 120. The connectivity provider network 120 might then be configured to attach to the authentication server 300E outside the connectivity provider network 120 either directly from the network node 110 or via its own (internal) authentication server 300I. Specifically, for providing initial connectivity, before connectivity provider specific subscription information has been downloaded to the communications device 200, the connectivity provider may rely on an external authentication service provided by another vendor. The connectivity provider network 120 in turn is operatively connected to a service network 150, such as the Internet, possibly comprising at least one second communications device 180 that could be a data server (DS). The service network 150 is further operatively connected to an enterprise network 160. The enterprise network 160 comprises a management server (MS) 170 and possibly at least one second communications device 180 that could be a DS.

As an example, the communications device 200 could belong to the enterprise of the enterprise network 160 and be configured to provide sensor data (or other type of data) to one or more of the second communications devices 180 located either in the enterprise network 160 or in the service network 150. The enterprise manages the communications device 200 through the management server 170. Management comprises providing identities and credentials to the communications device 200 and the second communications devices 180 to which the communications device 200 is communicating with such that secure communication can be established. The connectivity provider network 120 may, partly or fully, also be provided by the enterprise.

The so-called 3GPP identity technology, where 3GPP is short for third generation partnership project, is a well-proven identity technology that might be leveraged as identity technology for constrained devices, not only for constrained devices to access cellular networks, but also for other constrained devices to access non-cellular networks such as WiFi. The 3GPP Authentication and Key Agreement (AKA) protocol is agnostic to the underlying network and can for example be tunneled in the Extensible Authentication Protocol (EAP) using the EAP-AKA (and EAP-AKA'). EAP is a commonly used authentication and key agreement protocol as part of network attachment, e.g. for WiFi network access. Using EAP-AKA (or EAP-AKA') allows existing security infrastructure (e.g. at enterprises) to be used that easily can integrate with the authentication systems (such as HSS) of mobile network operators (MNOs).

Changing subscription from one mobile network operator to another is for mobile phones today mostly done by physically replacing the existing universal integrated-circuit card (UICC) or subscriber identity module or subscriber identification module (SIM) card with a new UICC/SIM card for the new mobile network operator. For constrained devices installed at remote locations and hard to reach places, sending out maintenance personnel for such an operation is a costly operation, and may even not be possible for some constrained devices (e.g. hermetically sealed constrained devices). Instead, a way of securely updating/changing the subscription from remote is needed.

The so-called embedded UICC (eUICC) is a dedicated UICC chip integrated into the device, i.e. it is not removable. However, at the same time, remote management of the eUICC and the subscriptions stored on it is provided such that users or device owners can change subscriptions for their devices and the new subscription data is provisioned onto the eUICC remotely. GSMA (GSM Association, where GSM is short for Global System for Mobile communication) has specified two variants of such a remote SIM provisioning protocol; one for consumer type devices and one for machine-to-machine (M2M) type devices. For the consumer variant the end-user controls the switch between profiles instead of the operator/remote provisioning server as in the M2M variant.

However, for constrained devices even the use of an embedded UICC may add unreasonable cost to the device. The next phase in the UICC evolution is the integrated UICC (iUICC) in which the UICC is integrated into the System-on-Chip of the modem/application processor. There is today no exact definition of the iUICC. In some aspects, a dedicated central processing unit (CPU) core with its own dedicated memory and peripherals might constitute the iUICC. An iUICC may alternatively be realized using hardware isolation mechanisms such as ARM TrustZone or Intel SGX.

An overview of an architecture of a communications network for connectivity management in the GSMA consumer variant is shown in FIG. 2. The end-user 410 owning and/or using the device may here order a new profile download from the MNO 420. The MNO 420 prepares a profile provisioning server, SM-DP+ 430 (short for enhanced Subscription Manager Data Preparation), for the profile download. The end-user 410 triggers the profile download (and switch of profile) via a Local Profile Assistant (LPAd) available in the device via a user interface. The LPAd comprises a Local Discovery (LDSd) entity, a Local Profile Download (LPDd) entity, and a Local User Interface (LUId) entity. The suffix d indicates that the entity is part of the communications device 200. An eUICC/iUICC manufacturer (EUM) 460 is the entity that manufactured the eUICC/iUICC. The manufacturer of an iUICC is typically the device manufacturer. The Certificate Issuer (CI) 450 is the issuer of certificates used in profile download and other operations. Operational interfaces are shown as directional arrows connecting the entities 120-460. For example, ES9+ is the interface between SM-DP+ 430 and LPAd/LPDd in the communications device 200, and ES10b is the interface between LPAd/LPDd and the eUICC/iUICC, whereas ES8+ is the interface between SM-DP+ 430 and the eUICC/iUICC in the communications device 200.

FIG. 3 is a signalling diagram of profile download to the communications device 200. For protection of the profile download secure communication is established between the eUICC/iUICC and the SM-DP+ 430 as well between the LPAd and the SM-DP+ 430.

The use of the GSMA consumer variant for constrained devices poses problems in that many constrained devices do not have a user interface for communication with the end-user/device owner 410. Instead the constrained device is managed and configured via a Management Server (MS) using a dedicated management protocol such as LightweightM2M (LwM2M).

A communications device 200 may by itself not have Internet connectivity (e.g. before first subscription profile download) such that it can connect to the provisioning server SM-DP+. The GSMA RSP consumer variant defines the concept of a companion device and a primary device where a companion device is a communications device that relies on the primary device for connectivity and/or user interface during profile provisioning and local profile management. Secure communication, for example by means of HTTPS (short for HTTP Secure, where HTTP is short for Hypertext Transfer Protocol), is mandated between the companion device and the primary device for protection of the user interface to trigger profile management operations.

The use of the GSMA consumer variant for so-called Internet of Things (IoT) devices poses issues in that many IoT devices do not have a user interface for communication with the end-user/device owner. The concept of companion device and primary device described above allows the device owner/user to interact with the device (i.e. the LPAd) via the network interface from a central controlling unit, such as a device management server. However, many constrained IoT devices do not support HTTPS. For the user interface part a secure communication using e.g. DTLS could be used between the communications device 200 and the management server.

One issue with some communications devices 120, such as IoT devices, is how to provide initial connectivity (e.g. over a cellular network or a WiFi network) the first time the communications devices 120 is to be booted up. The operational network that the communications devices 120 shall connect to may not be known at the manufacturing (or at the system integration phase) of the communications devices 120 and there may not be other interfaces in the communications devices 120, besides the network interface, for configuring this information. Consumer devices, such as mobile phones, often have additional network interfaces, such as for WiFi connectivity, allowing them to gain network connectivity via a primary device as described above. But for many IoT devices, especially constrained IoT devices, there is only one single network interface and adding cost for another radio interface for local communication only for gaining initial connectivity can sometimes not be motivated.

One option to provide initial connectivity is by means of available open networks (for which access authentication is not required), e.g. open WiFi networks. A communications device 120 may be configured to search for available open networks and try to attach to them such that the communications device 120 is enabled to download the subscription profile for the operational network. Open networks have the drawback that they may be used by any communications device which means the capacity may be very limited. A network service provider that wants to offer a particular quality of service to its customers therefore typically uses closed networks, e.g. closed WiFi networks. There can be cases where temporary initial connectivity is provided through an open network such that the subscription profile for the operational network may be downloaded. However, the use of a temporary open network is not always available. Some networks, such as the cellular networks, are by definition always closed and require access authentication.

Another option is to configure the communications device 200 with temporary access credentials in order to connect to a cellular network. This requires that the communications device 200 has an additional interface where the end-user/device owner can configure the communications device 200 with the temporary access credentials without relying on the network interface. But as mentioned above, for many constrained IoT devices such an additional interface is not available, and all configurations of the communications device 200 thus need to be performed via the network interface which then prevents the use of this option.

Another option is to configure the communications device 200 with a provisioning profile at manufacturing that gives initial connectivity such that the operation subscription profile can be downloaded. However, the selection of suitable provisioning profile must be made before manufacturing of the communications device 200. This might cause issues if it is not known in what geographical region the communications device 200 will be deployed. Different provisioning profiles may be required in different geographical regions. For example, it must be ensured that a particular provisioning profile of a particular mobile network operator inserted by a manufacturer has roaming agreement with the mobile network operator providing network access in the geographical region where the communications device 200 is installed.

In yet another option the eUICC/iUICC certificate, and associated private key, of the eUICC/iUICC are utilized when authenticating the communications device 200 for initial network access. This would typically require changes to the existing functions of the eUICC/iUICC.

Hence, there is still a need for improved mechanisms for providing initial network access for a communications device, in general and for providing initial network authentication for the communications device in particular.

SUMMARY

An object of embodiments herein is to provide efficient provision of initial network authentication for a communications device which does not suffer from the issues mentioned above, or at least where these issues are reduced or mitigated.

According to a first aspect there is presented a method for initial network authentication between a communications device and a network. The method is performed by the communications device. The communications device comprises an identity module supporting remote subscription profile download. The identity module comprises credentials for remote subscription profile download. The method comprises performing a first message exchange with an authentication server. The first message exchange comprises an identity module challenge obtained from the identity module being transmitted to the authentication server from the communications device. The method comprises receiving a second message from the authentication server. The second message comprises an ephemeral public key of the authentication server, an authentication server challenge and an authentication server signature. The authentication server signature is based on the ephemeral public key of the authentication server, the authentication server challenge, and the identity module challenge and follows a format used for handling remote subscription profile download to the identity module. The method comprises transmitting a third message towards the authentication server. The third message comprises an ephemeral public key of the communications device and an identity module signature. The identity module signature is based on the identity module credentials used for remote subscription profile download and is based on the ephemeral public key of the communications device and the authentication server challenge and follows the format used for remote subscription profile download to the identity module. The method comprises generating a master session key (MSK) from a shared secret established using the ephemeral public key of the authentication server and a private key corresponding to the ephemeral public key of the communications device. The MSK is for use when establishing secure communication between the communications device and the network.

According to a second aspect there is presented a communications device for initial network authentication between the communications device and a network. The communications device comprises an identity module supporting remote subscription profile download. The identity module comprises credentials for remote subscription profile download. The communications device further comprises processing circuitry. The processing circuitry is configured to cause the communications device to perform a first message exchange with an authentication server. The first message exchange comprises an identity module challenge obtained from the identity module being transmitted to the authentication server from the communications device. The processing circuitry is configured to cause the communications device to receive a second message from the authentication server. The second message comprises an ephemeral public key of the authentication server, an authentication server challenge and an authentication server signature. The authentication server signature is based on the ephemeral public key of the authentication server, the authentication server challenge, and the identity module challenge and follows a format used for handling remote subscription profile download to the identity module. The processing circuitry is configured to cause the communications device to transmit a third message towards the authentication server. The third message comprises an ephemeral public key of the communications device and an identity module signature. The identity module signature is based on the identity module credentials used for remote subscription profile download and is based on the ephemeral public key of the communications device and the authentication server challenge and follows the format used for remote subscription profile download to the identity module. The processing circuitry is configured to cause the communications device to generate a master session key (MSK) from a shared secret established using the ephemeral public key of the authentication server and a private key corresponding to the ephemeral public key of the communications device. The MSK is for use when establishing secure communication between the communications device and the network.

According to a third aspect there is presented a communications device for initial network authentication between the communications device and a network. The communications device comprises an identity module supporting remote subscription profile download. The identity module comprises credentials for remote subscription profile download. The communications device further comprises a perform module configured to perform a first message exchange with an authentication server. The first message exchange comprises an identity module challenge obtained from the identity module being transmitted to the authentication server from the communications device. The communications device further comprises a receive module configured to receive a second message from the authentication server. The second message comprises an ephemeral public key of the authentication server, an authentication server challenge and an authentication server signature. The authentication server signature is based on the ephemeral public key of the authentication server, the authentication server challenge, and the identity module challenge and follows a format used for handling remote subscription profile download to the identity module. The communications device further comprises a transmit module configured to transmit a third message towards the authentication server. The third message comprises an ephemeral public key of the communications device and an identity module signature. The identity module signature is based on the identity module credentials used for remote subscription profile download and is based on the ephemeral public key of the communications device and the authentication server challenge and follows the format used for remote subscription profile download to the identity module. The communications device further comprises a generate module configured to generate a master session key (MSK) from a shared secret established using the ephemeral public key of the authentication server and a private key corresponding to the ephemeral public key of the communications device. The MSK is for use when establishing secure communication between the communications device and the network.

According to a fourth aspect there is presented a computer program for initial network authentication between a communications device and a network. The computer program comprises computer program code which, when run on processing circuitry of a communications device, causes the communications device 200 to perform a method according to the first aspect.

According to a fifth aspect there is presented a method for initial network authentication between a communications device and a network. The method is performed by an authentication server. The communications device comprises an identity module supporting remote subscription profile download. The identity module comprises credentials for remote subscription profile download. The method comprises performing a first message exchange with the communications device. The first message exchange comprises receiving from the communications device an identity module challenge obtained from the identity module. The method comprises transmitting a second message towards the communications device. The second message comprises an ephemeral public key of the authentication server, an authentication server challenge and an authentication server signature. The authentication server signature is based on the ephemeral public key of the authentication server, the authentication server challenge, and the identity module challenge and follows a format used for handling remote subscription profile download to the identity module. The method comprises receiving a third message from the communications device. The third message comprises an ephemeral public key of the communications device and an identity module signature. The identity module signature is based on the identity module credentials used for remote subscription profile download and is based on the ephemeral public key of the communications device and the authentication server challenge and follows the format used for remote subscription profile download to the identity module. The method comprises generating a master session key (MSK) from a shared secret established using the ephemeral public key of the communications device and a private key corresponding to the ephemeral public key of the authentication server. The MSK is for use when establishing secure communication between the communications device and the network.

According to a sixth aspect there is presented an authentication server for initial network authentication between a communications device and a network. The communications device comprises an identity module supporting remote subscription profile download. The identity module comprises credentials for remote subscription profile download. The authentication server comprises processing circuitry. The processing circuitry is configured to cause the authentication server to perform a first message exchange with the communications device. The first message exchange comprises receiving from the communications device an identity module challenge obtained from the identity module. The processing circuitry is configured to cause the authentication server to transmit a second message towards the communications device. The second message comprises an ephemeral public key of the authentication server, an authentication server challenge and an authentication server signature. The authentication server signature is based on the ephemeral public key of the authentication server, the authentication server challenge, and the identity module challenge and follows a format used for handling remote subscription profile download to the identity module. The processing circuitry is configured to cause the authentication server to receive a third message from the communications device. The third message comprises an ephemeral public key of the communications device and an identity module signature. The identity module signature is based on the identity module credentials used for remote subscription profile download and is based on the ephemeral public key of the communications device and the authentication server challenge and follows the format used for remote subscription profile download to the identity module. The processing circuitry is configured to cause the authentication server to generate a master session key (MSK) from a shared secret established using the ephemeral public key of the communications device and a private key corresponding to the ephemeral public key of the authentication server. The MSK is for use when establishing secure communication between the communications device and the network.

According to a seventh aspect there is presented an authentication server for initial network authentication between a communications device and a network. The communications device comprises an identity module supporting remote subscription profile download. The identity module comprises credentials for remote subscription profile download. The authentication server comprises a perform module configured to perform a first message exchange with the communications device. The first message exchange comprises receiving from the communications device an identity module challenge obtained from the identity module. The authentication server comprises a transmit module configured to transmit a second message towards the communications device. The second message comprises an ephemeral public key of the authentication server, an authentication server challenge and an authentication server signature. The authentication server signature is based on the ephemeral public key of the authentication server, the authentication server challenge, and the identity module challenge and follows a format used for handling remote subscription profile download to the identity module. The authentication server comprises a receive module configured to receive a third message from the communications device. The third message comprises an ephemeral public key of the communications device and an identity module signature. The identity module signature is based on the identity module credentials used for remote subscription profile download and is based on the ephemeral public key of the communications device and the authentication server challenge and follows the format used for remote subscription profile download to the identity module. The authentication server comprises a generate module configured to generate a master session key (MSK) from a shared secret established using the ephemeral public key of the communications device and a private key corresponding to the ephemeral public key of the authentication server. The MSK is for use when establishing secure communication between the communications device and the network.

According to an eight aspect there is presented a computer program for initial network authentication between a communications device and a network, the computer program comprising computer program code which, when run on processing circuitry of an authentication server, causes the authentication server to perform a method according to the fifth aspect.

According to a ninth aspect there is presented a computer program product comprising a computer program according to at least one of the fourth aspect and the eight aspect and a computer readable storage medium on which the computer program is stored. The computer readable storage medium could be a non-transitory computer readable storage medium.

Advantageously these methods, these communications devices, these authentication servers, and these computer programs enable efficient provision of initial network authentication for the communications device.

Advantageously the proposed provision of initial network authentication does not suffer form the issues mentioned above, or at least reduces or mitigates these issues.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

As disclosed above there is still a need for efficient provision of initial network authentication for a communications device.

The embodiments disclosed herein therefore relate to mechanisms for initial network authentication between a communications device 200 and a network 120. In order to obtain such mechanisms there is provided a communications device 200, a method performed by the communications device 200, a computer program product comprising code, for example in the form of a computer program, that when run on processing circuitry of the communications device 200, causes the communications device 200 to perform the method. In order to obtain such mechanisms there is further provided an authentication server 300I, 300E, a method performed by the authentication server 300I, 300E, and a computer program product comprising code, for example in the form of a computer program, that when run on processing circuitry of the authentication server 300I, 300E, causes the authentication server 300I, 300E to perform the method.

In some aspects there is provided mechanisms for providing initial connectivity for a communications device 200 with an identity module, such as an UICC, eUICC or iUICC. In some aspects the identity module is equipped from manufacturing with credentials for handling remote subscription profile download according to the GSMA Remote SIM Provisioning consumer variant. These credentials are traditionally used for mutual authentication between the identity module and the provisioning server during subscription profile download. According to at least some of the embodiments disclosed herein these credentials are also used for initial network authentication. The proposed initial network authentication makes use of existing functions and identity module interface (part of the ES10 interface) for authentication.

Figure 4:
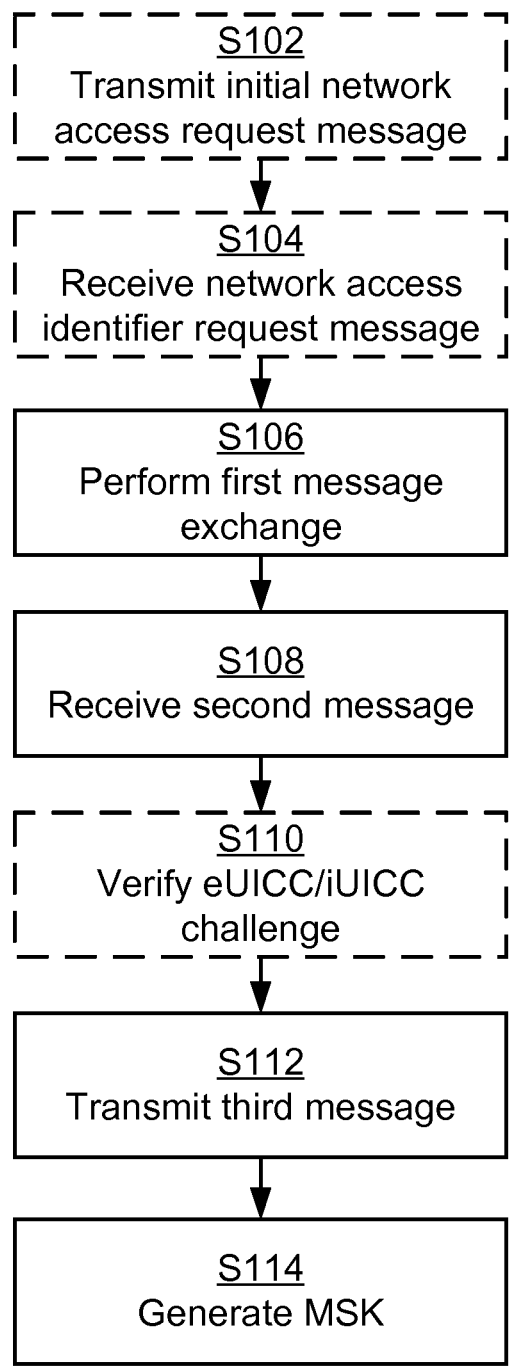
FIGS. 4 and 5 are flowcharts of methods according to embodiments.

Reference is now made to FIG. 4 illustrating a method for initial network authentication between a communications device 200 and a network 120 as performed by the communications device 200 according to an embodiment. The communications device 200 comprises an identity module supporting remote subscription profile download, and the identity module comprises credentials for remote subscription profile download.

A first message exchange is performed between the communications device 200 and the authentication server 300I, 300E. Particularly, the communications device 200 is configured to perform step S106:

S106: The communications device 200 performs a first message exchange with an authentication server 300I, 300E. The first message exchange comprises an identity module challenge obtained from the identity module being transmitted to the authentication server 300I, 300E from the communications device 200.

In this respect, the identity module challenge is a challenge value generated by the identity module and used as part of a challenge-response authentication procedure between the communications device 200 and the authentication server 300I, 300E. The authentication server 300I, 300E responds by transmitting a second message to the communications device 200. Particularly, the communications device 200 is configured to perform step S108:

S108: The communications device 200 receives a second message from the authentication server 300I, 300E. The second message comprises an ephemeral public key of the authentication server 300I, 300E, an authentication server challenge and an authentication server signature. The authentication server signature is based on the ephemeral public key of the authentication server 300I, 300E, the authentication server challenge, and the identity module challenge and follows a format used for handling remote subscription profile download to the identity module.

In this respect, the authentication server challenge is a challenge value generated by the authentication server and used as part of the challenge-response authentication procedure between the communications device 200 and the authentication server 300I, 300E. Further, the authentication server signature is a digital signature created by the authentication server 300I, 300E. The communications device 200 responds by transmitting a third message to the authentication server 300I, 300E. Particularly, the communications device 200 is configured to perform step S112:

S112: The communications device 200 transmits a third message towards the authentication server 300I, 300E. The third message comprises an ephemeral public key of the communications device 200 and an identity module signature. The identity module signature is based on the identity module credentials used for remote subscription profile download and is based on the ephemeral public key of the communications device 200 and the authentication server challenge and follows the format used for remote subscription profile download to the identity module.

In this respect, the identity module signature is a digital signature created by the identity module. The communications device 200 is then able to generate a master session key (MSK). Particularly, the communications device 200 is configured to perform step S114:

S114: The communications device 200 generates an MSK from a shared secret established using the ephemeral public key of the authentication server 300I, 300E and a private key corresponding to the ephemeral public key of the communications device 200. The MSK is for use when establishing secure communication between the communications device 200 and the network 120.

Advantageously, already existing credentials and procedures for authentication for profile download can be reused for initial connectivity. The proposed method can be used with existing identity modules supporting the consumer variant of the GSMA remote SIM provisioning protocol and does not require additional support.

Embodiments relating to further details of initial network authentication between a communications device 200 and a network 120 as performed by the communications device 200 will now be disclosed.

In some aspects a request for initial network access is transmitted from the communications device 200 to a network node 110 in the network 120. Hence, according to an embodiment the communications device 200 is configured to perform (optional) step S102:

S102: The communications device 200 transmits an initial network access request message to a network node 110 in the network 120.

As disclosed above, the network node 110 could be an AP or a GW. The network node 110 responds with a network access identifier request message. Hence, according to this embodiment the communications device 200 is configured to perform (optional) step S104:

S104: The communications device 200 receives a network access identifier request message from the network node 110 in response thereto (i.e., in response to having transmitted the initial network access request message in step S102). The first message exchange (as in step S106) is then performed in response to having received the network access identifier request message from the network node 110.

Steps S102 and S104 are thus preferably performed before step S106,

Aspects of the first message exchange will now be disclosed.

There may be different ways to perform the first message exchange. According to an embodiment the first message exchange comprises a primary message being transmitted from the communications device 200 to the authentication server 300I, 300E.

There could be different ways to provide the identity module challenge from the communications device 200 to the authentication server 300I, 300E. According to an embodiment the primary message comprises the identity module challenge obtained from the identity module. Further embodiment of how to provide the identity module challenge from the communications device 200 to the authentication server 300I, 300E will be disclosed below There could be further information provided in the primary message.

According to an embodiment the primary message exchange comprises at least one trusted public key identifier of the identity module of the communications device 200 used for remote subscription profile download to the identity module. An example of trusted public key identifier is a Certificate Issuer Public Key Identifier (CIPKIds)

According to an embodiment at least one of the primary message and the third message comprises an identifier of the communications device 200. There could be different types of identifiers. Typically the identifier is given as a sequence, or string, of characters.

Further, the primary message might enable the network node 110 to identify the authentication server 300I, 300E in order for the network node 110 to forward the primary message to a valid authentication server 300I, 300E. Thus, according to an embodiment the primary message is transmitted to a network node 110 for being forwarded by the network node 110 to the authentication server 300I, 300E, and the primary message comprises information enabling the network node 110 to identify the authentication server 300I, 300E.

Figure 3:
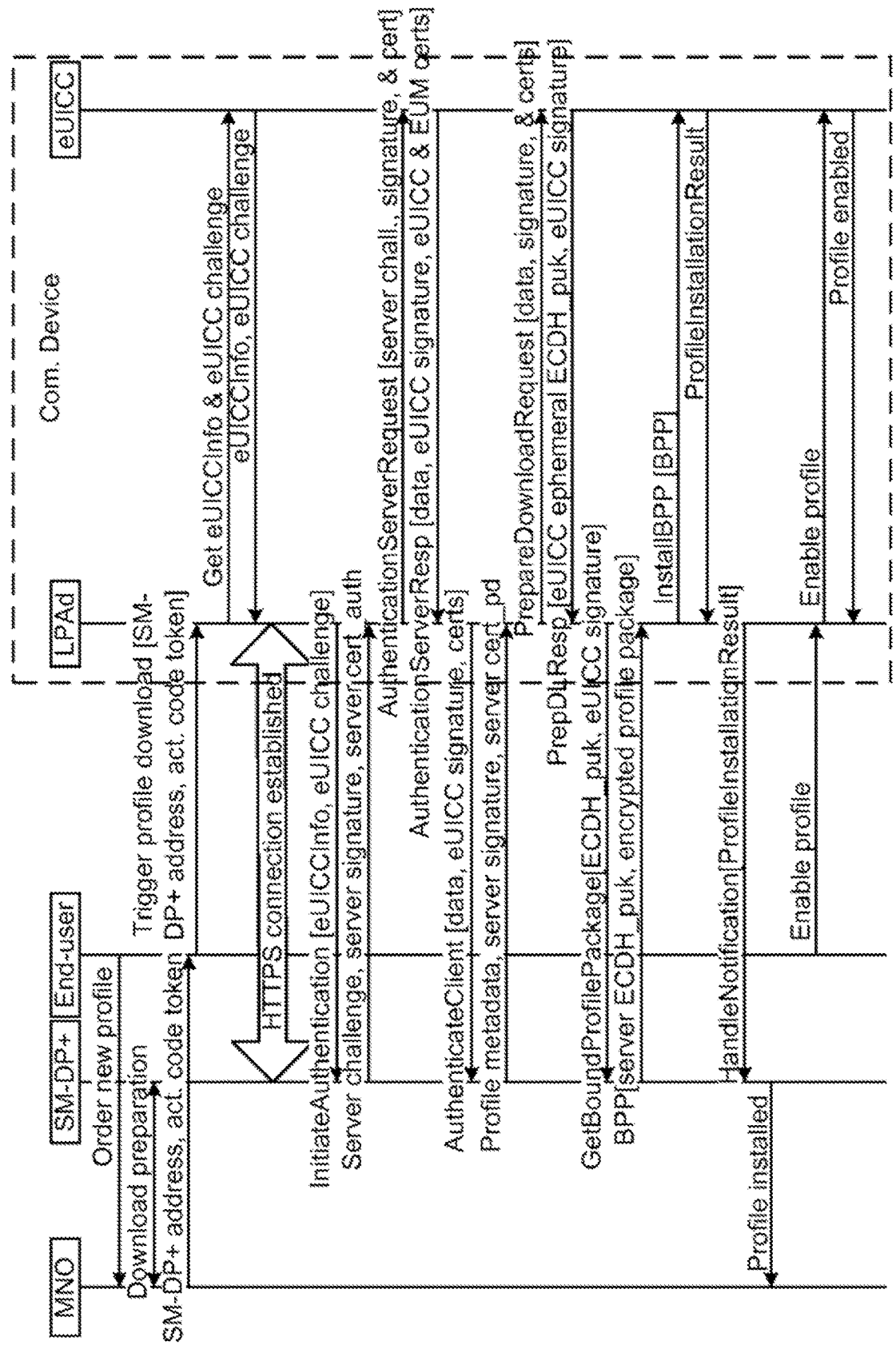
FIG. 3 is a signalling diagram.

There could be different types of information that enables the network node 110 to identify the authentication server 300I, 300E. On example of such information is the network address of the authentication server 300I, 300E. Hence, according to an embodiment the information is provided in the primary message as a network address of the authentication server 300I, 300E. According to an embodiment the network address is either hardcoded in the communications device 200 or configured through a user interface of the communications device 200. Further in this respect, the communications device 200 might comprise an interface (that is usable before the communications device 200 has initial connectivity) where the end-user/device owner may configure the network address of the authentication server 300I, 300E. Additionally or alternatively the end-user/device owner may configure the communications device 200 with information of which connectivity providing network (in case many networks are available) the communications device 200 shall use for gaining initial network access. In some aspects the network address of the authentication server 300I, 300E and/or the information on which connectivity providing network to use may be provided as part of the Access Code (or similar data) that the user/device owner has obtained from the mobile network operator upon requesting a new subscription profile and that is configured to the communications device 200 for use in the subscription profile download. This is further disclosed with reference to FIG. 3. In other aspects the primary message lacks a network address of the authentication server 300I, 300E. How such scenarios can be handled will be disclosed below.

There could be different types of primary messages. According to an embodiment the primary message is an EAP-Response/Identity message.

According to an embodiment the first message exchange comprises a secondary message being transmitted towards the authentication server 300I, 300E from the communications device 200. The secondary message is transmitted after the primary message but before receiving the second message. The secondary message comprises the identity module challenge and at least one trusted public key identifier of the identity module of the communications device 200 used for the remote subscription profile download to the identity module. The identity module challenge and certificate issuer public key identifiers could thereby be sent in a separate message i.e. not sent as part of the EAP-Response/Identity message.

Aspects of the second message will now be disclosed.

In some aspects the identity module challenge is returned to the communications device 200 from the authentication server 300I, 300E. Thus, according to an embodiment the second message comprises the identity module challenge.

The communications device 200 might then check whether the identity module challenge as received from the authentication server 300I, 300E matches the identity module challenge created by the communications device itself or not.

Particularly, according to an embodiment the communications device 200 is configured to perform (optional) step S110:

S110: The communications device 200 verifies that the identity module challenge in the second message matches the identity module challenge in the first message.

As will be disclosed below, the authentication server 300I, 300E might compare the at least one public key identifier to its own at least one public key identifier. According to an embodiment the second message comprises at least one of the at least one public key identifier as trusted by the authentication server 300I, 300E.

There could be different types of second messages. According to an embodiment the second message is an EAP-Request/Authenticate message.

Aspects of the third message will now be disclosed.

There could be different types of third messages. According to an embodiment the third message is an EAP-Response/Authenticate message.

Figure 5:
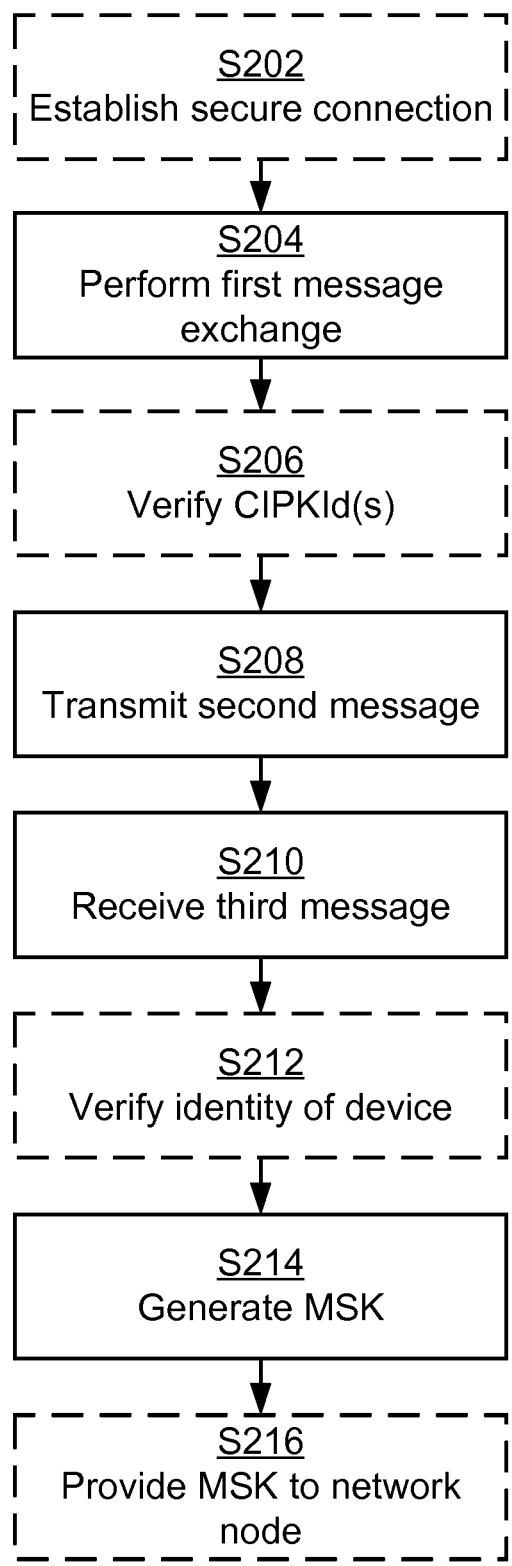

Reference is now made to FIG. 5 illustrating a method for initial network authentication between a communications device 200 and a network 120 as performed by the authentication server 300I, 300E according to an embodiment. As disclosed above, the communications device 200 comprises an identity module supporting remote subscription profile download, and the identity module comprises credentials for remote subscription profile download.

As disclosed above, a first message exchange is performed between the communications device 200 and the authentication server 300I, 300E. Hence, the authentication server 300I, 300E is configured to perform step S204:

S204: The authentication server 300I, 300E performs a first message exchange with the communications device 200. As disclosed above, the first message exchange comprises receiving from the communications device 200 an identity module challenge obtained from the identity module.

As disclosed above, a second message is received by the communications device 200 from the authentication server 300I, 300E. Hence, the authentication server 300I, 300E is configured to perform step S208:

S208: The authentication server 300I, 300E transmits a second message towards the communications device 200. As disclosed above, the second message comprises an ephemeral public key of the authentication server 300I, 300E, an authentication server challenge and an authentication server signature. The authentication server signature is based on the ephemeral public key of the authentication server 300I, 300E, the authentication server challenge, and the identity module challenge and follows a format used for handling remote subscription profile download to the identity module.

As disclosed above, a third message is transmitted by the communications device 200 to the authentication server 300I, 300E. Hence, the authentication server 300I, 300E is configured to perform step S210:

S210: The authentication server 300I, 300E receives a third message from the communications device 200. As disclosed above, the third message comprises an ephemeral public key of the communications device 200 and an identity module signature. The identity module signature is based on the identity module credentials used for remote subscription profile download and is based on the ephemeral public key of the communications device 200 and the authentication server challenge and follows the format used for remote subscription profile download to the identity module.

Similar to the communications device 200, the authentication server 300I, 300E then generates an MSK. Particularly, the authentication server 300I, 300E is configured to perform step S214:

S214: The authentication server 300I, 300E generates an MSK from a shared secret established using the ephemeral public key of the communications device 200 and a private key corresponding to the ephemeral public key of the authentication server 300I, 300E. The MSK is for use when establishing secure communication between the communications device 200 and the network 120.

Embodiments relating to further details of initial network authentication between a communications device 200 and a network 120 as performed by the authentication server 300I, 300E will now be disclosed.

There could be different types of authentication servers 300I, 300E. According to an embodiment the authentication server 300I, 300E is an Authentication, Authorization and Accounting (AAA) server, an Authentication Server Function (AUSF) server or a Mobility Management Entity (MME).

Further, the functionality of the authentication server 300I, 300E for initial network authentication might be provided as a connectivity provider specific service. For example, an MNO that already hosts an SM-DP+ and provides subscription profile download could provide also initial network authentication service for its subscribers. In a roaming case, a connectivity provider may have roaming agreements with another connectivity provider that provides the authentication service.

The initial network authentication service may also be provided by a global service hosted by an alliance of connectivity providers. As an example, GSMA is today certifying vendors for subscription profile download services and may extend that to also include initial network authentication, and GSMA could for example set up its own authentication server(s) 300E (typically outside the connectivity provider network 120) by implementing the embodiments disclosed herein.

As a third option the initial network authentication may be a service hosted by a manufacturer (or a group of manufacturers) of identity modules (such as in case the identity module is an eUICC) or communications devices 200 (such as in the case the identity module is an iUICC). For example, if an enterprise owning communications devices 200 is also providing the connectivity for its own communications devices 200 the enterprise may configure its network to connect to the authentication server 300E (typically outside the connectivity provider network 120) of the manufacturer of its communications devices 200. Due to the enterprise buying communications devices 200 from the manufacturer there is already an established trust relation and the use of such an initial network authentication service could be included as part of the agreement between the enterprise and the manufacturer.

According to an embodiment the first message exchange is performed with the communications device 200 via a network node 110 in the network 120. The authentication server 300I, 300E might then establish a secure connection to the network node 110. Hence, according to an embodiment the authentication server 300I, 300E is configured to perform (optional) step S202:

S202: The authentication server 300I, 300E establishes a secure connection to the network node 110 before performing the first message exchange with the communications device 200.

As disclosed above, in an embodiment the communications device 200 transmits to the authentication server 300I, 300E, during the first message exchange, at least one trusted public key identifier of the identity module used for remote subscription profile download to the identity module. In some aspects the authentication server 300I, 300E checks that at least one of the at least one trusted public key identifier is trusted by the authentication server 300I, 300E. Particularly, according to an embodiment the first message exchange comprises receiving from the communications device 200 at least one trusted public key identifier of the identity module used for remote subscription profile download to the identity module. The authentication server 300I, 300E is then configured to perform (optional) step S206:

S206: The authentication server 300I, 300E verifies that at least one of the at least one public key identifier is trusted by the authentication server 300I, 300E. Such a trusted public key identifier is then sent back to the communications device 200. Thus, in this embodiment the second message comprises at least one of the at least one public key identifier trusted by the authentication server 300I, 300E.

As disclosed above, in some aspects the identity module challenge is sent during the first message exchange. Hence, according to an embodiment the first message exchange comprises receiving the identity module challenge from the communications device 200.

In some aspects the authentication server 300I, 300E provides the MSK to the network node 110. Hence, according to an embodiment the authentication server 300I, 300E is configured to perform (optional) step S216:

S216: The authentication server 300I, 300E provides the MSK to the network node 110 in the network 120 for the network node 110 to use the MSK when establishing the secure communication with the communications device 200. The network node 110 might then use the MSK when deriving traffic encryption and integrity protection keys to be used for securing communications to the communications device 200.

As disclosed above, according to an embodiment an identifier of the communications device 200 is received from the communications device 200 during the first message exchange and/or in the third message. In some aspects the authentication server 300I, 300E is configured with a list of identifiers for those communications devices 200 for which initial connectivity is to be granted. The authentication server 300I, 300E might then be configured to perform (optional) step S212:

S212: The authentication server 300I, 300E verifies, by using the identifier and before generating the MSK, that initial network access is to be granted to the communications device 200.

In this respect the authentication server 300I, 300E might perform the verifying in step S212 by matching the received identifier to a list of identifiers, and where the initial network access is granted only when a match is found in the list of identifiers.

When the identifier is received during the first message exchange, then step S212 can be performed directly after the first message exchange, i.e. after step S204 but before step S206 such that step S206 and any steps following thereafter are not performed if the verifying in step S212 results in that initial network access is not to be granted to the communications device 200.

There could be different types of messages transmitted between the communications device 200 and the authentication server 300I, 300E. According to an embodiment all messages transmitted between the communications device 200 and the authentication server 300I, 300E are Extensible Authentication Protocol (EAP) messages.

There could be different types of ephemeral public keys. According to an embodiment the ephemeral public keys are ephemeral Elliptic Curve (EC) public keys.

There could be different examples of credentials used for mutual authentication between the communications device 200 and the authentication server 300I, 300E. According to an embodiment the credentials comprises a private key, a certificate certifying the public key corresponding to the private key, and trusted public key identifiers.

There could be different types of identity modules. According to an embodiment the identity module is a (removable) universal integrated-circuit card (UICC), an embedded universal integrated-circuit card (eUICC), or an integrated universal integrated-circuit card (iUICC).

There could be different ways to perform the remote subscription profile download. According to an embodiment the remote subscription profile download follows the GSMA Remote SIM Provisioning (RSP) protocol.

Figure 6:
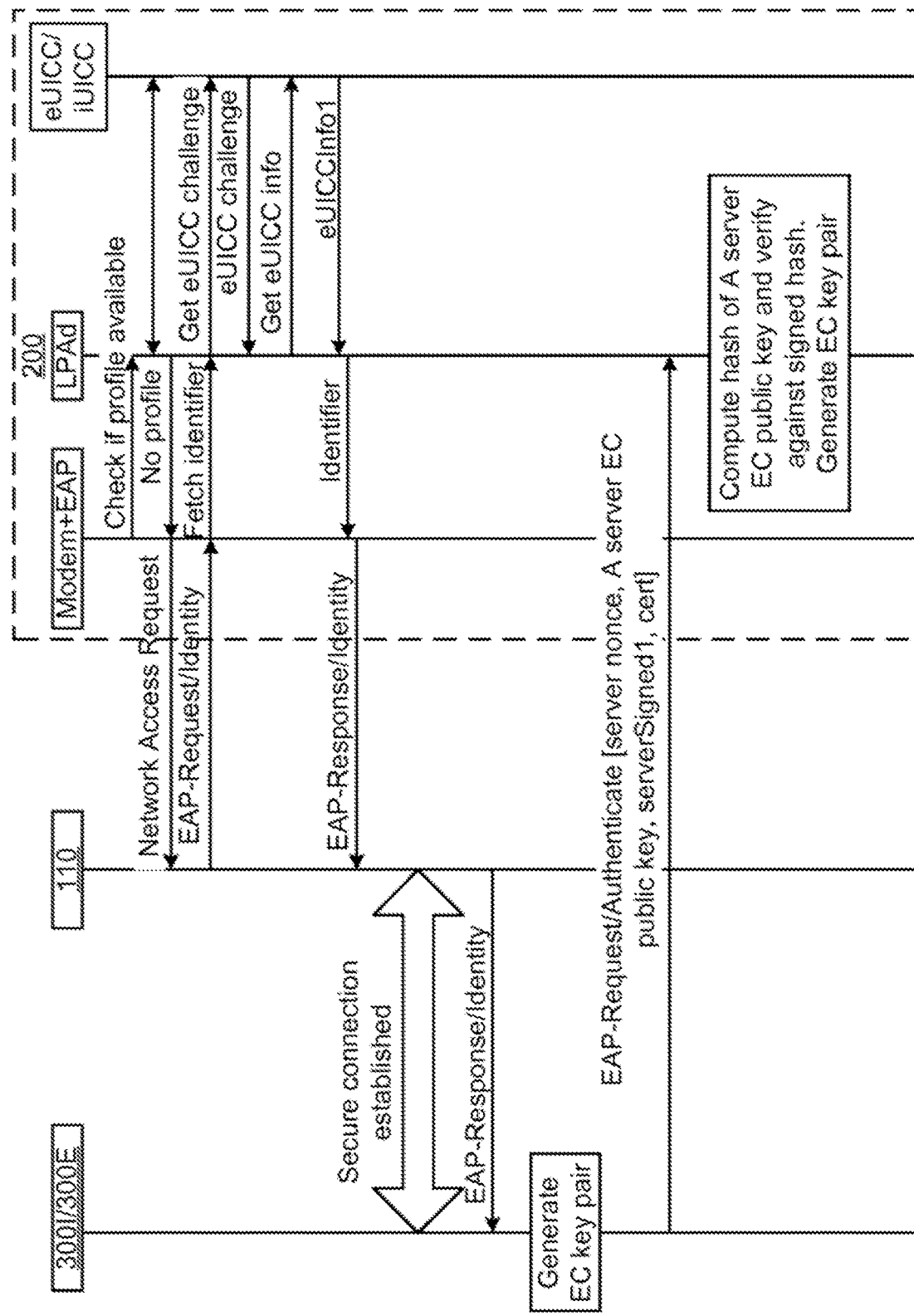
FIG. 6 is a signalling diagram according to an embodiment.
Figure 6:
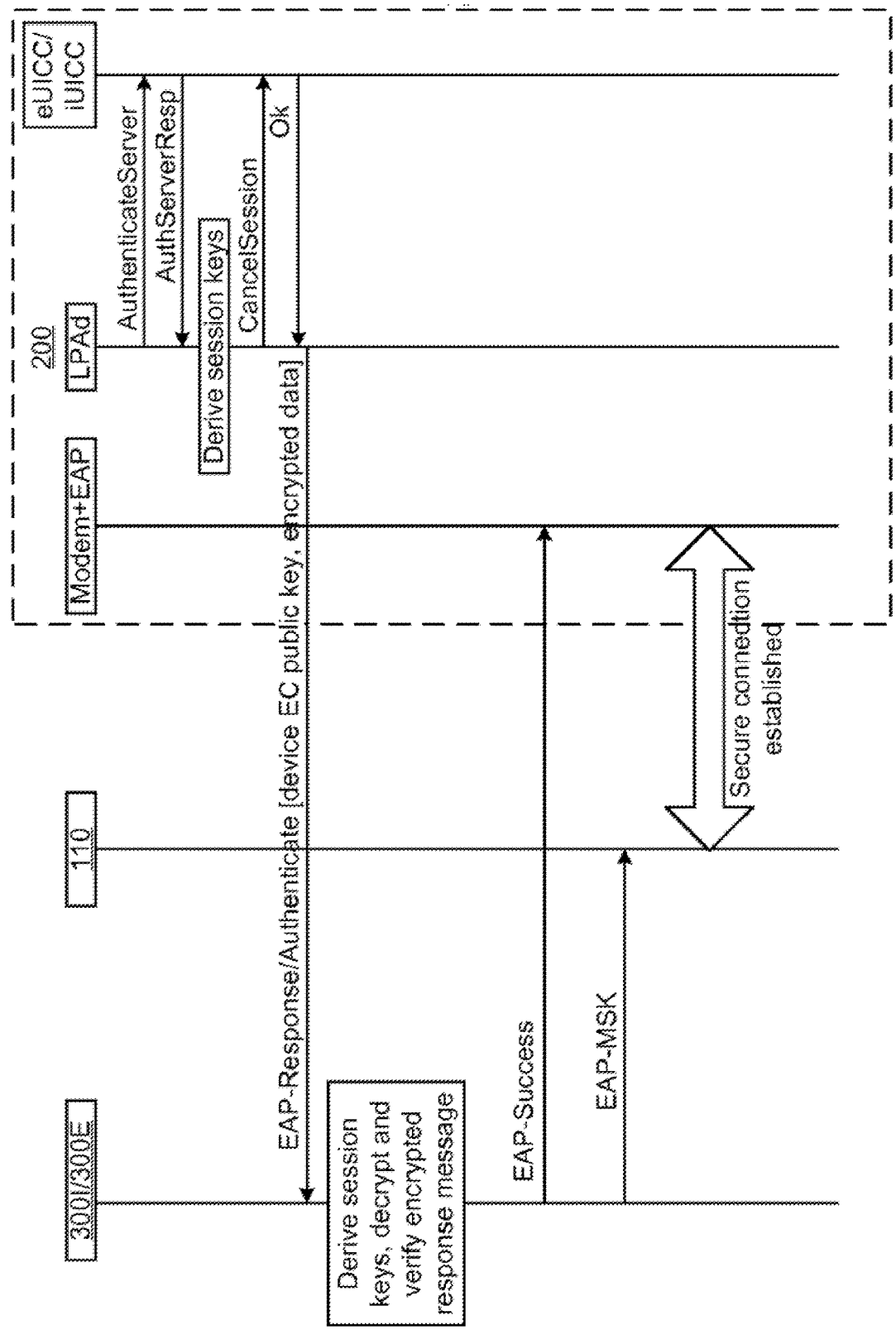

One particular embodiment for initial network authentication between a communications device 200 and a network 120 based on at least some of the above disclosed embodiments will now be disclosed in detail with reference to the signalling diagram of FIG. 6.

In the below the identity module will be exemplified by an eUICC or iUICC, collectively referred to as eUICC/iUICC. In the below the eUICC/iUICC is assumed to support the consumer variant of the GSMA Remote SIM Provisioning protocol. This protocol includes a signalling procedure for mutual authentication run as part of the ES8+ interface that is leveraged for the initial network access authentication. The Extensible Authentication Protocol (EAP) is used during the initial network access authentication.

In the communications device 200, part of the procedure is implemented in the LPAd (or at least the part of the LPAd residing in the communications device 200, denoted LPAdv, in case of a split LPAd when the consumer variant is adapted for IoT devices). LPAd makes use of eUICC/iUICC functions via the ES10 interface.

When the communications device 200 makes a request to attach to a network 120 it first checks whether it has a 3GPP subscription profile for use (message: "Check if profile available"). If such a subscription profile is available then this subscription profile is used. This subscription profile may then be used in an EAP-AKA (or EAP-AKA') protocol or a "raw" AKA protocol depending on the network access authentication procedure used. However, if no subscription profile is available, this is signaled back from the LPAd to the modem in the communications device 200 (message: "No profile") that triggers an EAP based network attachment request (message: "Network Access Request"). The network node 110 responds to the network attachment request (message: "EAP-Request/Identity"). In this respect, in scenarios where networks from several service providers are available when the communications device 200 shall obtain initial network access, and there is no information configured in the communications device 200 regarding what network to attach to, then the communications device 200 might try several networks before succeeding in gaining initial network access. In this respect, the communications device 200 might be configured to try one network and, upon failure, continue to the next network until access is granted or until all available networks have been tried.

Upon receiving the EAP-Request/Identity message the LPAd determines an identifier of the communications device 200 to be sent as the EAP-Response/Identity message (message: "Fetch identifier"). The message should allow the network node 110 to identify the authentication server 110. The message should include the eUICC/iUICC challenge, and might include the Certificate Issuer Public Key Identifiers (CIPKIds) supported on the eUICC/iUICC for signature verification and creation. The eUICC/iUICC might have a dedicated CI root public key/certificate installed for initial connectivity in addition to those used for subscription profile download. The LPAd might obtain the eUICC/iUICC challenge and CIPKIds from the eUICC/iUICC using the ES10 commands GetEUICCChallenge and GetEUICCInfo (messages: "Get eUICC challenge", "eUICC challenge", "Get eUICC info", and "eUICCInfo1") and then provide the information to the modem (message: "Identifier"), where this information is then provided to the network node 110 (message: "EAP-Response/Identity"). One suitable structure for the EAP-Response/Identity response message is:

initialnetworkaccess.<challenge>.[[v][s]<CIPKId_1>] . . . [[v][s]<CIPKId_n>]@address, where <challenge> is a placeholder for the eUICC/iUICC challenge represented as 32 characters in the set {0-9,A-F} and <CIPKId_i> is a 40-character (from the same set) placeholder for a Certificate Issuer Public Key Identifiers supported on the eUICC/iUICC, <address> is the network address of the authentication server 300I, 300E, and where the optional characters 'v' and 's' in front indicate whether the CIPKId is for verification and signing, respectively. One example Response/Identity response message is:

initialnetworkaccess.55F328B43577b9b94A9FFAC3 54DFAFB3.vsF54172BD F98A95D65CBEB88A 38A1C11D800A85C3@dummyAAA.com The network address of the authentication server 300I, 300E might be hardcoded into the LPAd or the eUICC/iUICC. Further, some types of communications devices 200 comprises an interface that can be used before the communications device 200 has initial network access over its main network interface and through which the end-user/device owner may configure information. It might then be possible for the end-user/device owner to configure the network address to be used in the EAP-Response/Identity message. This network address might provide information on which connectivity provider (in case many networks are available) that the communications devices shall use for gaining initial network access. In case the network address is independent of the connectivity provider, additional information might be provided. In some case only a simple user interface with buttons is available where the end-user/device owner may configure, based on a list of available networks, which network to use. In this case a network address might not be provided. The interface may also be short range radio interface for which Internet Protocol (IP) connectivity is not supported (and hence it cannot be used for subscription profile download via a primary device if the LPAd is in the communications device 200 itself (but could work in the case of LPAdv)), over which the network address and/or information of the network to use is configured. In further aspects, when the communications device 200 device comprises a full LPAd, the network address and/or information regarding which network to use for initial connectivity might be provided as part of the Access Code (or similar data) that is configured to the communications device 200 via the interface. In case of roaming, not only the network to connect to but also the home network might be configured in the communications device. The network address in the EAP-Response/Identity might then indicate to the serving network which is the home network.

If the network address is not known to the communications device 200, the communications device 200 might use 'void' as the network address which indicates to the network node 110 that the network node 110 must fill in the address upon receiving the EAP-Response/Identity message from the communications device 200. If the authentication server 300E is hosted by a global alliance such as GSMA the network address of the authentication server 300E is typically well-known and may be hardcoded into the network node 110. Similarly, if the connectivity provider has an authentication server 300I supporting initial connectivity, the network address is typically known to the network node 110. In the case the authentication server 300E is hosted by a device manufacturer/eUICC manufacturer or alliance of manufacturers the network address is typically known at manufacturing could then be configured in the communications device 200 during its manufacturing.

The connectivity provider might not blindly trust any network address provided by the communications device 200. Unless the network node 110 or network 120 is configured with a hard-coded network address of the authentication server 300I, 300E that the network node 110 will always use (and thus where any other network address provided by the communications device 200 is replaced), the network node 110 might be configured with a whitelist of network addresses of authentication servers 300I, 300E that it will accept based upon existing trust relations. If the provided network address is not on this list the network node 110 might reject the network access request. Alternatively, or in addition to having such a whitelist, the acceptance of a given authentication server 300I, 300E (or the network address thereof) by the connectivity provider might depend on the presented certificate by the authentication server 300I, 300E when secure communications is established with the authentication server 300I, 300E.

For example, a certificate issued by a CA (or a subordinate CA chaining back to this CA) used by a global alliance such as GSMA may typically be accepted by a connectivity provider also being a member of the same global alliance. In further aspects the whitelist and set of trusted certificates may, for the same connectivity provider, be different depending on the geographical region in which the network node 110 is located and the network providers (enterprises) in that geographical region that the connectivity provider has a relation with. For example, a particular network node 110 covering a certain geographical region may whitelist a particular authentication server 300E of a device manufacturer whose communications devices 200 are used by an enterprise in that geographical region.

The network node 110 can, based on the EAP-Response/Identity message, recognize which authentication server 300I, 300E that should handle the EAP based network access request. After establishing a secure connection (message: "Secure connection established") with this authentication server 300I, 300E, the network node 110 forwards the EAP-Response/Identity message to the authentication server 300I, 300E (message: "EAP-Response/Identity"). In another option, the connectivity provider network 120 is configured with an internal authentication server 300I, but another authentication server 300E external to the connectivity provider network 120 is used for the initial network authentication. In this option the network node 110 may be configured to forward the EAP-Response/Identity message towards the internal authentication server 300I that handles the communication towards the external authentication server 300E and that instead of the network node 110 performs all checks and complement of the address according to the above.

The authentication server 300I, 300E checks that at least one of the Certificate Issuer Public Key Identifiers for signing (provided in the EAP-Response/Identity message) are trusted by the authentication server 300I, 300E. If not, an error response is sent to the network node 110. If trusted, the authentication server 300I, 300E initiates an authentication procedure by generating an ephemeral EC key pair and a nonce (defining the server challenge) and then calculates the hash of the EC public key concatenated with the nonce using SHA-256, resulting in a 32-byte hash value (message: "Generate EC key pair"). The authentication server 300I, 300E then creates a serverSigned1 structure as defined in the GSMA RSP Technical Specification, version 2.2, where the parameter transactionID is set to the 16 first bytes of the hash value and the parameter serverChallenge is set to the 16 last bytes. The received eUICC/iUICC challenge is also inserted in the structure along with the network address of the authentication server 300I, 300E. The authentication server 300I, 300E then signs this structure using its private key whose public key has been certified by a Certificate Issuer matching one of the Certificate Issuer Public Key Identifiers for verification provided in the EAP-Response/Identity message. Alternatively, the public key is certified by an intermediate Certificate Authority (CA) whose public key directly, or via other intermediate CAs, is certified by a Certificate Issuer matching one of the Certificate Issuer Public Key Identifiers for verification. If no Certificate Issuer Public Key Identifiers for verification was provided then the authentication server 300I, 300E selects a private key on its own. Having a certificate issued by a root CA, or by a subordinate CA linking back via a certificate chain to a root CA, that the eUICC/iUICC trusts may follow from certification similar to certificates for profile download. For example, a global alliance, such as GSMA, may issue certificates for authentication servers 300I, 300E for initial connectivity similar to how they issue provisioning (SM-DP+) server certificates, and, if the functionality of the authentication server 300I, 300E is combined with that of an SM-DP+, the same certificate might be utilized for both purposes. In the case the initial connectivity authentication service is hosted by a manufacturer of identity modules or communications devices 200 it is up to the manufacturer to certify its own server(s).

The authentication server 300I, 300E then sends the EAP-Request/Authenticate message to the network node 110 (message: "EAP-Request/Authenticate"). This message includes the server nonce, authentication (A) server EC public key, serverSigned1 structure, the signature, authentication server certificate (and possibly other intermediate CA certificates), and the Certificate Issuer Public Key Identifier to be used by the eUICC/iUICC when signing. The network node 110 forwards this message to the communications device 200 where the message is forwarded internally to the LPAd.

The LPAd computes the hash of the server nonce and the authentication server EC public key and checks that computed 32-byte value matches the concatenation of the values of transactionID and serverChallenge in serverSigned1. If it does not match an error response is sent to the network node 110. Otherwise the LPAd continues and generates an ephemeral EC key pair (message: "Compute hash of A server EC public key and nonce and verify against signed hash. Generate EC key pair"). It then creates the AuthenticateServerRequest structure to be sent to the eUICC/iUICC. The serverSigned1, serverSignature1, euiccCiPKIdToBeUsed, and serverCertificate (or possibly list of certificates) fields are populated by the corresponding data received from the authentication server 300I, 300E. The ctxParams1 structure is populated with the device ephemeral EC public key. A new CtxParams1 alternative to ctxParamsForCommonAuthentication is added, denoted ctxParamsForInitialNetworkAccess, which is an OCTET STRING containing the EC public key. The CtxParams1 format is not considered by the eUICC/iUICC. The LPAd then sends this data to the eUICC/iUICC (message: "AuthenticateServer").

The eUICC/iUICC parses the AuthenticateServerRequest structure and verifies the authentication server certificate (serverCertificate) (and possibly other intermediate CA certificates) using the installed public key of the Certificate Issuer. The eUICC/iUICC then verifies the signature (serverSignature1) on the structure serverSigned1 using the authentication server (permanent) public key obtained from the authentication server certificate (serverCertificate). Upon successful verification the eUICC/iUICC parses the serverSigned1 structure and checks that received euiccChallenge matches the latest created euiccChallenge.

If all checks are successful, the authentication server 300I, 300E is now successfully authenticated by the communications device 120 through the use of the eUICC/iUICC. The eUICC/iUICC creates a success response that is sent to the LPAd (message: "AuthServerResp"). In order to do this the euiccSigned1 structure is first created and signed by the eUICC/iUICC. This structure consists of the received transactionId, serverAddress, serverChallenge, and ctxParams1 fields and a field called eUICCInfo2 which provides information about the eUICC/iUICC. The signature is created using a (permanent) EC private key of the eUICC/iUICC that is also used for subscription profile download. Besides the euiccSigned1 and the signature euiccSignature1 the eUICC/iUICC certificate and eUICC/iUICC manufacturer certificate (and possibly other intermediate CA certificates chaining back to the root CA/Certificate Issuer) are also included in AuthenticateServerResponse. The eUICC/iUICC certificate contains the public key corresponding to the private key used to create euiccSignature1 and is issued by the eUICC/iUICC manufacturer. The eUICC/iUICC manufacturer certificate is issued by a root CA (or another intermediate CA that chains back to the root CA) trusted by the authentication server 300I, 300E, i.e., its public key identifier matches the euiccCiPKIdToBeUsed public key identifier provided in the AuthenticateServerRequest message. The AuthenticateServerResponse structure is returned as response on the AuthenticateServer command by the eUICC/iUICC. The LPAd parses the AuthenticateServerResponse message to determine it is a success response and then it knows the authentication server was successfully authenticated. If an error response is received the LPAd signals an error towards the authentication server.

Upon success response, the LPAd uses the Elliptic-curve Diffie-Hellman (ECDH) algorithm to derive the Diffie-Hellman shared secret from the authentication server ephemeral EC public key and the communications device ephemeral EC private key. From the shared secret it derives sessions keys, for example using SHA-256 on the shared secret concatenated with a fixed string and a counter, where the operation is repeated until enough key material is obtained and counter is increased every time/round (message: "Derive session keys"). The following session keys are derived: EAP-MSK, which is used as master key from which traffic encryption and integrity protection keys are derived for protection of the communication between the communications device 200 and the network node 110; EAP-EMSK, which is a key defined by EAP (according to the EAP specification this key is optional to derive); and an encryption key, EKEY, which is used to encrypt parts of the EAP-Response/Authenticate message to avoid revealing eUICC/iUICC data for privacy reasons.

Depending on the eUICC/iUICC implementation the LPAd may need to send a command to the eUICC/iUICC to cancel the ongoing session, since there will be no further interaction with the eUICC/iUICC related to this session (message: "CancelSession") which the eUICC/iUICC responds to (message: "Ok").

The LPAd creates a response message to the authentication server 300I, 300E, where the response message consists of the device ephemeral EC public key and encrypted data. The encrypted data is generated by encrypting plaintext data using the derived encryption key, EKEY, and e.g. the AES-CCM algorithm, where AES is short for Advanced Encryption Standard, and where CCM is short for Counter with CBC-MAC, where CBC-MAC is short for cipher block chaining message authentication code. The plaintext data is the concatenation of euiccSigned1*, euiccSignature1, the eUICC/iUICC certificate, and the eUICC/iUICC manufacturer certificate (and possibly other intermediate CAs). The euiccSigned1* is the euiccSigned1 except for the ctxParams1 bits that may be reconstructed at the receiver side from the device ephemeral EC public key. The device ephemeral EC public key might be part of the additional authenticated data (AAD) if an authenticated encryption with associated data (AEAD) algorithm such as AES-CCM is used. In other aspects not the complete euiccSigned1* is part of the plaintext but only euiccInfo2 since the rest of euiccSigned1* is already known to the authentication server 300I, 300E. The response message is sent to the network node 110 that forwards it to the authentication server 300I, 300E (message: "EAP-Response/Authenticate"). The EAP-MSK (and optionally also the EAP-EMSK) are delivered to the EAP module (message: "EAP-MSK") for use in deriving traffic encryption and integrity protection keys.

The authentication server 300I, 300E uses the ECDH algorithm to derive the Diffie-Hellman shared secret from the received communications device ephemeral EC public key and the authentication server ephemeral EC private key. From the shared secret it derives session keys according to what was described above for the device side (message: "Derive session keys, decrypt and verify encrypted response message"). The EAP-RSP encryption key is to then used to decrypt (and verify in case of AEAD algorithm) the encrypted data. The eUICC/iUICC manufacturer certificate is then verified with help of the certificate issuer public key (obtained from the certificate issuer root certificate), and possibly other intermediate CA certificates, and the eUICC/iUICC certificate is then verified using the public key from the eUICC/iUICC manufacturer certificate. Then the euiccSigned1 structure is reconstructed using the device ephemeral EC public key and euiccSignature1 is verified. Finally, it is checked that the transactionId and serverChallenge of the EAP-Request/Authenticate message matches the values received in serverSigned1. If all checks are successful then the communications device 200 is successfully authenticated (message: "EAP-Success") and the authentication server 300I, 300E sends message to the communications device 200 indicating successful authentication and delivers the EAP-MSK to the network node 110 for use in deriving traffic encryption and integrity protection keys (message: "EAP-MSK"). A secure connection between the network node 110 and the communications device 200 can then be established (message: "Secure connection established").

In some aspects the authentication server 300I, 300E and SM-DP+ are owned by the same entity, e.g. a mobile network operator or third party used by the mobile network operator for subscription profile download and initial connectivity service. The authentication server 300I, 300E and SM-DP+ might then utilize common functions for authentication (and possibly common credentials) and common databases related to device and eUICC/iUICC information.

In some aspects the authentication server 300I, 300E has a whitelist of eUICC/iUICC identifiers and/or device identifiers for which initial connectivity is to be granted. The whitelist might be provided by the device owner (e.g. an enterprise) to the authentication server 300I, 300E (via the owner of the authentication server 300I, 300E). The whitelist might, in the case the authentication server 300I, 300E is owned by the mobile network operator from which the communications device 200 will obtain its operation subscription profile, be provided by the device owner when the device owner is ordering subscription profiles for its communications devices 200. Further, the eUICC identity (EID), which is part of the eUICC/iUICC certificate, is the listed identifier of the communications device 200. The authentication server 300I, 300E might then be configured to extract the EID from the eUICC/iUICC certificate when validating the certificate and check that the extracted EID is part of the whitelist. If not, an error response is sent to the communications device 200 and/or network node 110.

Further, the communications device 200 might include a device identifier (e.g. International Mobile Equipment Identity; IMEI) as part of the ctxParams1 structure which is signed by the eUICC/iUICC. If the listed identifiers are device identifiers then the authentication server 300I, 300E checks for a device identifier as part of the ctxParams1 structure after having successfully verified euiccSignture1. For faster check that the communications device 200 is legitimate, the device/eUICC/iUICC identifier might be included as part of the EAP-Response/Identity message. In this case the authentication server 300I, 300E might extract the identifier and compare it against the whitelist already upon receiving the EAP-Response/Identity message. Even if the device identifier is sent as part of the EAP-Response/Identity the identifier might still be included in ctxParams1 such that it is signed by the eUICC/iUICC, but does not necessarily need to be sent as part of ctxParams1, and can be verified by the authentication server 300I, 300E.

If a connectivity provider such as an enterprise or mobile network operator uses an external authentication service (i.e. the authentication server 300E being external to the connectivity provider network 120) the knowledge of device/eUICC/iUICC identifier may still be known to the connectivity provider and the whitelist and associated filter function may be implemented inside the connectivity provider network 120 (for example in the authentication server 300I or similar network node).

In some aspects, negotiations relating to which algorithms to use, for example, encryption and key derivation algorithms, are performed between the communications device 200 and the authentication server 300I, 300E. The communications device 200 might then include an algorithm preference as part of the EAP-Response/Identity message and the authentication server 300I, 300E might select an algorithm set which is communicated in the EAP-Request/Authenticate message. For example, null encryption may be used, in which case there is no encryption of data in the EAP-Response/Authenticate message and "encrypted data" is the plaintext data (concatenation of euiccSigned1*, euiccSignature1, the eUICC/iUICC certificate, and the eUICC/iUICC manufacturer certificate, and possibly other intermediate CA certificates).

In some aspects, challenge, certificate issuer public key identifiers, and algorithm identifiers are not sent as part of the EAP-Response/Identity message. Instead an extra message roundtrip is added between the EAP-Response/Identity and the EAP-Request/Authenticate. The authentication server 300I, 300E sends an EAP-Request/Challenge to the communications device 200 that responds with an EAP-Response/Challenge message in which the challenge, certificate issuer public key identifiers, and algorithm identifiers are contained. This enables the EAP-Response/Identity to be kept clean from protocol related data.

Figure 7:
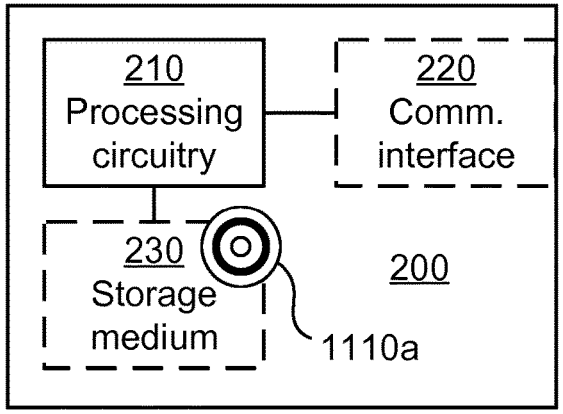
FIG. 7 is a schematic diagram showing functional units of a communications device according to an embodiment.

FIG. 7 schematically illustrates, in terms of a number of functional units, the components of a communications device 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1110a (as in FIG. 11), e.g. in the form of a storage medium 230. The processing circuitry 210 may further be provided as at least one application specific integrated circuit (ASIC), or field programmable gate array (FPGA).

Particularly, the processing circuitry 210 is configured to cause the communications device 200 to perform a set of operations, or steps, as disclosed above. For example, the storage medium 230 may store the set of operations, and the processing circuitry 210 may be configured to retrieve the set of operations from the storage medium 230 to cause the communications device 200 to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The communications device 200 may further comprise a communications interface 220 for communications with other entities, nodes, functions, and devices in the network 120. As such the communications interface 220 may comprise one or more transmitters and receivers, comprising analogue and digital components.

The processing circuitry 210 controls the general operation of the communications device 200 e.g. by sending data and control signals to the communications interface 220 and the storage medium 230, by receiving data and reports from the communications interface 220, and by retrieving data and instructions from the storage medium 230. Other components, as well as the related functionality, of the communications device 200 are omitted in order not to obscure the concepts presented herein.

Figure 8:
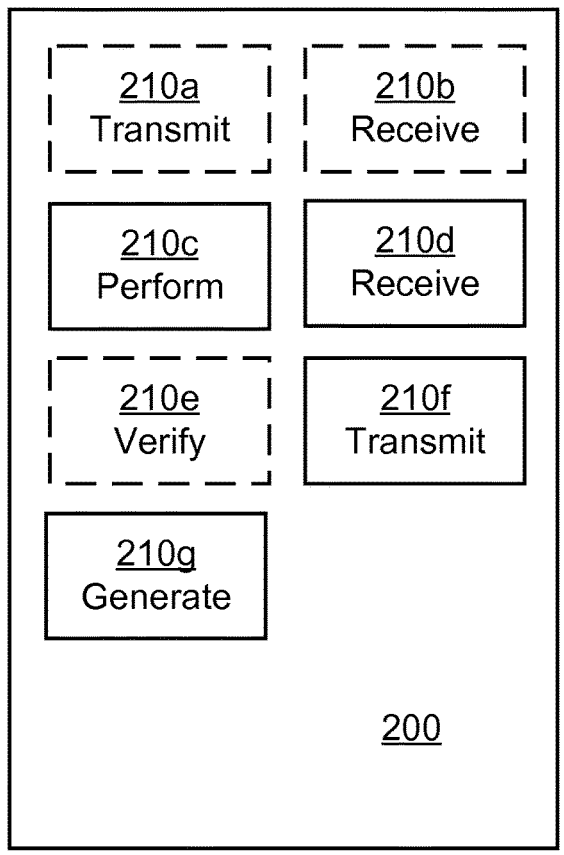
FIG. 8 is a schematic diagram showing functional modules of a communications device according to an embodiment.

FIG. 8 schematically illustrates, in terms of a number of functional modules, the components of a communications device 200 according to an embodiment. The communications device 200 of FIG. 8 comprises a number of functional modules; a perform module 210c configured to perform step S106, a receive module 210d configured to perform step S108, a transmit module 210f configured to perform step S112, and a generate module 210g configured to perform step S114. The communications device 200 of FIG. 8 may further comprise a number of optional functional modules, such as any of a transmit module 210a configured to perform step S102, a receive module 210b configured to perform step S104, and a verify module 210e configured to perform step S110. In general terms, each functional module 210a-210g may be implemented in hardware or in software. Preferably, one or more or all functional modules 210a-210g may be implemented by the processing circuitry 210, possibly in cooperation with the communications interface 220 and/or the storage medium 230. The processing circuitry 210 may thus be arranged to from the storage medium 230 fetch instructions as provided by a functional module 210a-210g and to execute these instructions, thereby performing any steps of the communications device 200 as disclosed herein.

Figure 9:
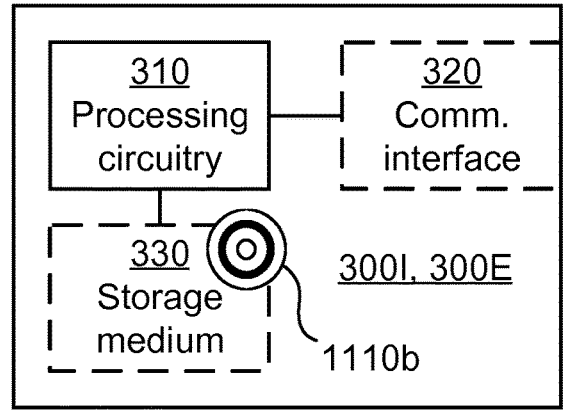
FIG. 9 is a schematic diagram showing functional units of an authentication server according to an embodiment.

FIG. 9 schematically illustrates, in terms of a number of functional units, the components of an authentication server 300I, 300E according to an embodiment. Processing circuitry 310 is provided using any combination of one or more of a suitable central processing unit (CPU), multiprocessor, microcontroller, digital signal processor (DSP), etc., capable of executing software instructions stored in a computer program product mob (as in FIG. 11), e.g. in the form of a storage medium 330. The processing circuitry 310 may further be provided as at least one application specific integrated circuit (ASIC), or field programmable gate array (FPGA).

Particularly, the processing circuitry 310 is configured to cause the authentication server 300I, 300E to perform a set of operations, or steps, as disclosed above. For example, the storage medium 330 may store the set of operations, and the processing circuitry 310 may be configured to retrieve the set of operations from the storage medium 330 to cause the authentication server 300I, 300E to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The authentication server 300I, 300E may further comprise a communications interface 320 for communications with other entities, nodes, functions, and devices in the network 120. As such the communications interface 320 may comprise one or more transmitters and receivers, comprising analogue and digital components.

The processing circuitry 310 controls the general operation of the authentication server 300I, 300E e.g. by sending data and control signals to the communications interface 320 and the storage medium 330, by receiving data and reports from the communications interface 320, and by retrieving data and instructions from the storage medium 330. Other components, as well as the related functionality, of the authentication server 300I, 300E are omitted in order not to obscure the concepts presented herein.

Figure 10:
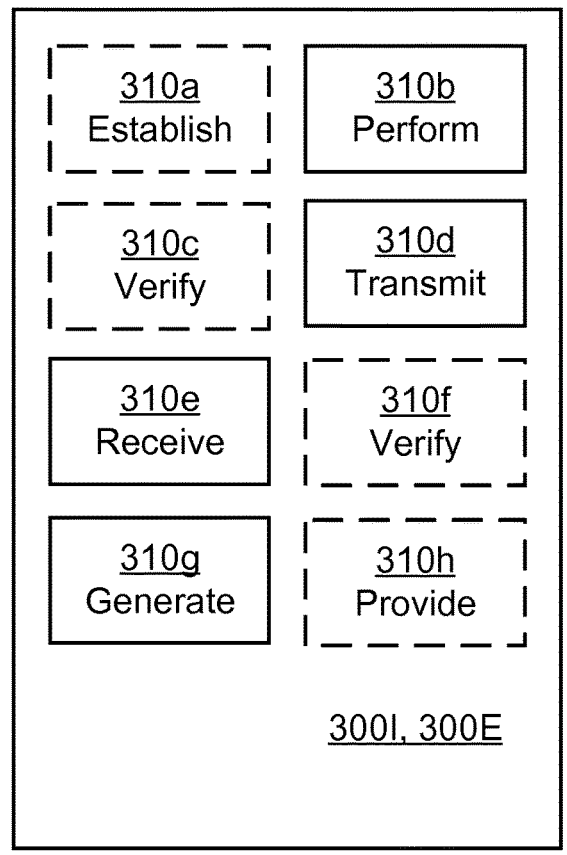
FIG. 10 is a schematic diagram showing functional modules of an authentication server according to an embodiment.

FIG. 10 schematically illustrates, in terms of a number of functional modules, the components of an authentication server 300I, 300E according to an embodiment. The authentication server 300I, 300E of FIG. 10 comprises a number of functional modules; a perform module 310b configured to perform step S204, a transmit module 310d configured to perform step S108, a receive module 310e configured to perform step S210, and a generate module 310g configured to perform step S114. The authentication server 300I, 300E of FIG. 10 may further comprise a number of optional functional modules, such as any of an establish module 310a configured to perform step S202, a verify module 310c configured to perform step S206, a verify module 310f configured to perform step S112, and a provide module 310h configured to perform step S216. In general terms, each functional module 310a-310h may be implemented in hardware or in software. Preferably, one or more or all functional modules 310a-310h may be implemented by the processing circuitry 310, possibly in cooperation with the communications interface 320 and/or the storage medium 330. The processing circuitry 310 may thus be arranged to from the storage medium 330 fetch instructions as provided by a functional module 310a-310h and to execute these instructions, thereby performing any steps of the authentication server 300I, 300E as disclosed herein.

The communications device 200 and/or authentication server 300I, 300E may be provided as respective standalone devices or as a part of respective further devices. Thus, a first portion of the instructions performed by the communications device 200 and/or authentication server 300I, 300E may be executed in a respective first device, and a second portion of the of the instructions performed by the communications device 200 and/or authentication server 300I, 300E may be executed in a respective second device; the herein disclosed embodiments are not limited to any particular number of devices on which the instructions performed by the communications device 200 and/or authentication server 300I, 300E may be executed. Hence, the methods according to the herein disclosed embodiments are suitable to be performed by a communications device 200 and/or authentication server 300I, 300E residing in a cloud computational environment. Therefore, although a single processing circuitry 210, 310 is illustrated in FIGS. 7 and 9 the processing circuitry 210, 310 may be distributed among a plurality of devices, or nodes. The same applies to the functional modules 210a-210g, 310a-310h of FIGS. 8 and 10 and the computer programs 1120a, 1120b of FIG. 11 (see below).

Figure 1:
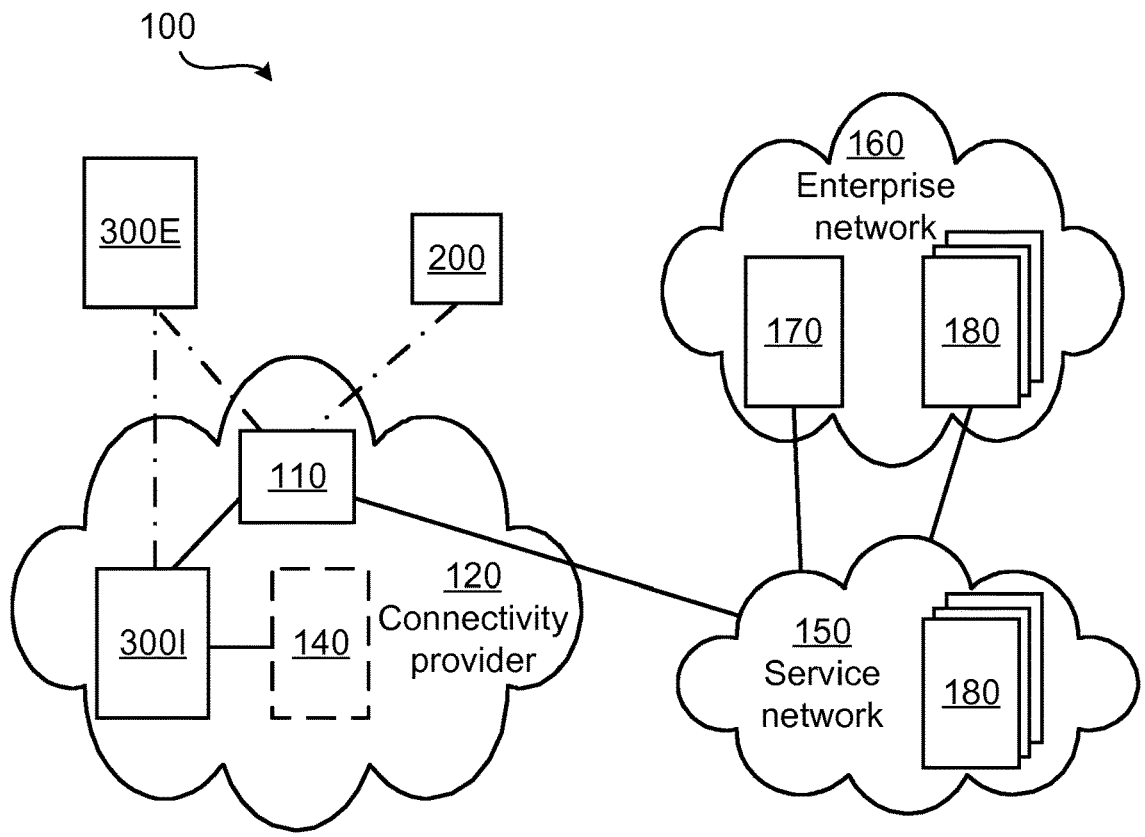
FIG. 1 is a schematic diagram illustrating a communication network according to embodiments.
Figure 11:
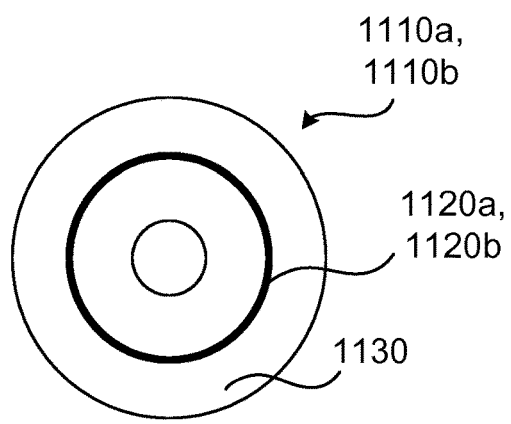
FIG. 11 shows one example of a computer program product comprising computer readable means according to an embodiment.
Figure 2:
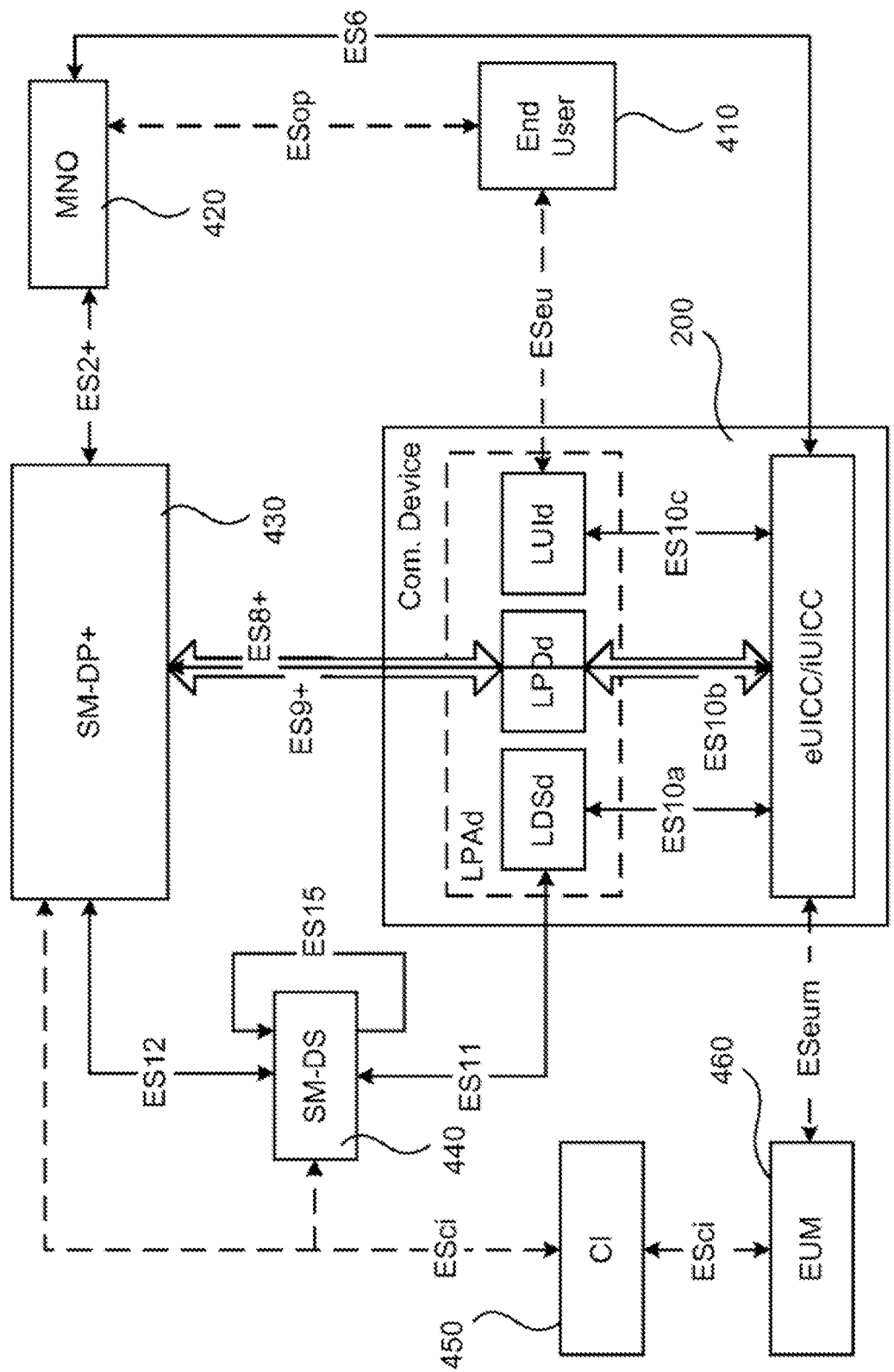
FIG. 2 is a schematic illustration of an architecture for connectivity management.

FIG. 11 shows one example of a computer program product moa, mob comprising computer readable means 1130. On this computer readable means 1130, a computer program 1120a can be stored, which computer program 1120a can cause the processing circuitry 210 and thereto operatively coupled entities and devices, such as the communications interface 220 and the storage medium 230, to execute methods according to embodiments described herein. The computer program 1120a and/or computer program product 1110a may thus provide means for performing any steps of the communications device 200 as herein disclosed. On this computer readable means 1130, a computer program 1120b can be stored, which computer program 1120b can cause the processing circuitry 310 and thereto operatively coupled entities and devices, such as the communications interface 320 and the storage medium 330, to execute methods according to embodiments described herein. The computer program 1120b and/or computer program product mob may thus provide means for performing any steps of the authentication server 300I, 300E as herein disclosed.

In the example of FIG. 11, the computer program product moa, mob is illustrated as an optical disc, such as a CD (compact disc) or a DVD (digital versatile disc) or a Blu-Ray disc. The computer program product moa, mob could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1120a, 1120b is here schematically shown as a track on the depicted optical disk, the computer program 1120a, 1120b can be stored in any way which is suitable for the computer program product moa, mob.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method comprising:
a communication device transmitting to a network node a network attachment request in response to determining that the communication device does not have a remote subscription profile, wherein the network node is remote from the communication device and wherein the network node is not a component of the communication device;
after transmitting the network attachment request, the communication device receiving a request message transmitted by the network node;
in response to receiving the request message transmitted by the network node, the communication device transmitting a primary message to the network node, wherein the primary message comprises an identity module challenge obtained from an identity module comprising an integrated circuit card (ICC) within the communication device after receiving the request message transmitted by the network node, and wherein the network node is configured to forward the identity module challenge to an authentication server in response to identifying the authentication server using a network address of the authentication server included in the primary message;

the communication device receiving, from the network node, a second message that was transmitted by the authentication server, wherein the second message comprises an ephemeral public key of the authentication server, an authentication server challenge, and an authentication server signature, wherein the authentication server signature is based on the ephemeral public key of the authentication server, the authentication server challenge, and the identity module challenge and follows a format used for handling the remote subscription profile download to the identity module;

the communication device transmitting a third message towards the authentication server in response to receiving the second message, wherein the third message comprises an ephemeral public key of the communication device and an identity module signature, wherein the identity module signature is based on identity module credentials used for the remote subscription profile download to the identity module and is based on the ephemeral public key of the communication device and the authentication server challenge and follows the format used for the remote subscription profile download to the identity module;

the communication device establishing a secret using the ephemeral public key of the authentication server and a private key corresponding to the ephemeral public key of the communication device;

the communication device generating a master session key (MSK) using the established secret;

the communication device obtaining data for transmission to the network node;

the communication device using the MSK to encrypt the data, thereby producing encrypted data;

and the communication device transmitting the encrypted data to the network node.

2. The method according to claim 1, wherein the network attachment request is an Extensible Authentication Protocol (EAP) based network attachment request.

3. The method according to claim 1, wherein the primary message comprises at least one trusted public key identifier of the identity module of the communication device used for the remote subscription profile download to the identity module.

4. The method according to claim 1, wherein at least one of the primary message and the third message comprises an identifier of the communication device.

5. The method according to claim 1, wherein the primary message is an Extensible Authentication Protocol (EAP) EAP-Response/Identity message.

6. The method according to claim 1, wherein the second message comprises the identity module challenge, and the method further comprises verifying that the identity module challenge in the second message matches the identity module challenge in the primary message.

7. The method according to claim 3, wherein the second message comprises at least one of the at least one trusted public key identifier of the identity module of the communication device as trusted by the authentication server, the second message is an Extensible Authentication Protocol (EAP) EAP-Request/Authenticate message, and the third message is an EAP-Response/Authenticate message.

8. The method of claim 1, wherein using the MSK to encrypt the data comprises using the MSK to derive a first encryption key and encrypting the data using the first encryption key.

9. The method of claim 8, further comprising:

the communication device generating a second encryption key (EKEY) using the established secret; and the communication device using the second encryption key (EKEY) to encrypt plaintext data, thereby producing encrypted plaintext data, wherein the third message comprises the encrypted plaintext data.

10. A method comprising:

an authentication server receiving a first message transmitted by a network node, wherein the first message comprises an identity module challenge that the network node received from a communication device, and wherein the authentication server establishes a secure connection with the network node before receiving the first message;

the authentication server verifying that at least one public key identifier of an identity module included in the first message is trusted by the authentication server, wherein the at least one public key identifier is used for a remote subscription profile download to the identity module;

the authentication server transmitting a second message towards the communication device in response to verifying the at least one public key identifier of the identity module is trusted by the authentication server, wherein the second message comprises an ephemeral public key of the authentication server, an authentication server challenge, and an authentication server signature, and wherein the authentication server signature is based on the ephemeral public key of the authentication server, the authentication server challenge, and the identity module challenge and follows a format used for handling the remote subscription profile download to the identity module;

the authentication server receiving a third message transmitted by the network node in response to the second message, wherein the third message comprises an ephemeral public key of the communication device and an identity module signature, and wherein the identity module signature is based on identity module credentials used for the remote subscription profile download to the identity module and is based on the ephemeral public key of the communication device and the authentication server challenge and follows the format used for the remote subscription profile download to the identity module;

the authentication server verifying identity of the communication device by matching an identifier of the communication device received in the third message with a list of identifiers, wherein an initial network access is granted only when a match is found in the list of identifiers;

the authentication server establishing a secret using the ephemeral public key of the communication device and a private key corresponding to the ephemeral public key of the authentication server;

the authentication server generating a master session key (MSK) using the established secret, wherein the MSK is associated with the ephemeral public key of the communication device and the private key of the authentication server;

and the authentication server providing the MSK to the network node for the network node to use the MSK when establishing secure communications with the communication device located remotely from the network node.

11. The method according to claim 10, wherein
the second message comprises at least one of the at least one public key identifier of the identity module trusted by the authentication server.

12. The method according to claim 10,
wherein the authentication server generates the MSK after verifying the identity of the communication device.

13. The method according to claim 10, wherein
the first message, the second message and the third message are Extensible Authentication Protocol messages,
the ephemeral public key of the authentication server and the ephemeral public key of the communication device are ephemeral Elliptic Curve public keys,
the identity module credentials comprises a private key, a certificate certifying a public key corresponding to the private key, and trusted public key identifiers.

14. The method according to claim 10, wherein
the authentication server is an Authentication, Authorization and Accounting server, an Authentication Server Function server, or a Mobility Management Entity,
the identity module is an universal integrated-circuit card, UICC, an embedded universal integrated-circuit card, eUICC, or an integrated universal integrated-circuit card, iUICC, and
the remote subscription profile download follows the GSMA Remote SIM Provisioning, RSP, protocol.

15. A communication device comprising processing circuitry, the processing circuitry being configured to cause the communication device to:
transmit to a network node a network attachment request in response to determining that the communication device does not have a remote subscription profile, wherein the network node is remote from the communication device and wherein the network node is not a component of the communication device;
after transmitting the network attachment request, receive a request message transmitted by the network node;
in response to receiving the request message transmitted by the network node, transmit a primary message to the network node, wherein the primary message comprises an identity module challenge obtained from an identity module comprising an integrated circuit card (ICC) within the communication device after receiving the request message transmitted by the network node, and wherein the network node is configured to forward the identity module challenge to an authentication server in response to identifying the authentication server using a network address of the authentication server included in the primary message;
receive, from the network node, a second message that was transmitted by the authentication server, wherein the second message comprises an ephemeral public key of the authentication server, an authentication server challenge, and an authentication server signature, wherein the authentication server signature is based on the ephemeral public key of the authentication server, the authentication server challenge, and the identity module challenge and follows a format used for handling the remote subscription profile download to the identity module;
transmit a third message towards the authentication server in response to receiving the second message, wherein the third message comprises an ephemeral public key of the communication device and an identity module signature, wherein the identity module signature is based on identity module credentials used for the remote subscription profile download to the identity module and is based on the ephemeral public key of the communication device and the authentication server challenge and follows the format used for the remote subscription profile download to the identity module;
establish a secret using the ephemeral public key of the authentication server and a private key corresponding to the ephemeral public key of the communication device;
generate a master session key (MSK) using the established secret;
obtain data for transmission to the network node;
use the MSK to encrypt the data, thereby producing encrypted data; and
transmit the encrypted data to the network node.

16. An authentication server, the authentication server comprising processing circuitry, the processing circuitry being configured to cause the authentication server to:
receive a first message transmitted by a network node, wherein the first message comprises an identity module challenge that the network node received from a communication device, and wherein the authentication server establishes a secure connection with the network node before receiving the first message;
verify that at least one public key identifier of an identity module included in the first message is trusted by the authentication server, wherein the at least one public key identifier is used for a remote subscription profile download to the identity module;
transmit a second message towards the communication device in response to verifying the at least one public key identifier of the identity module is trusted by the authentication server, wherein the second message comprises an ephemeral public key of the authentication server, an authentication server challenge, and an authentication server signature, and wherein the authentication server signature is based on the ephemeral public key of the authentication server, the authentication server challenge, and the identity module challenge and follows a format used for handling the remote subscription profile download to the identity module;
receive a third message transmitted by the network node in response to the second message, wherein the third message comprises an ephemeral public key of the communication device and an identity module signature, and wherein the identity module signature is based on identity module credentials used for the remote subscription profile download to the identity module and is based on the ephemeral public key of the communication device and the authentication server challenge and follows the format used for the remote subscription profile download to the identity module;
verify identity of the communication device by matching an identifier of the communication device received in the third message with a list of identifiers, wherein an initial network access is granted only when a match is found in the list of identifiers;

establish a secret using the ephemeral public key of the communication device and a private key corresponding to the ephemeral public key of the authentication server;

generate a master session key (MSK) using the established secret, wherein the MSK is associated with the ephemeral public key of the communication device and the private key of the authentication server; and provide the MSK to the network node for the network node to use the MSK when establishing secure communications with the communication device located remotely from the network node.

* * * * *